United States Patent [19]

Wise et al.

[11] Patent Number: 5,092,787
[45] Date of Patent: Mar. 3, 1992

[54] POWER DISTRIBUTION FOR MODULAR FURNITURE UNITS

[75] Inventors: James H. Wise, Palmyra; Jay L. French, Middletown; John L. Himes, Jr., Hummelstown; James S. Hower, Harrisburg; Douglas J. Pirc, Mechanicsburg; Ronald M. Weber, Lebanon, all of Pa.

[73] Assignee: AMP Incorporated, Harrisburg, Pa.

[21] Appl. No.: 714,318

[22] Filed: Jun. 10, 1991

Related U.S. Application Data

[63] Continuation of Ser. No. 539,284, Jun. 15, 1990, abandoned, which is a continuation of Ser. No. 394,775, Aug. 16, 1989, abandoned.

[51] Int. Cl.$^5$ ............................................. H01R 25/16
[52] U.S. Cl. .................................. 439/215; 439/211; 439/687
[58] Field of Search .............. 439/207, 209, 210, 211, 439/212, 214, 215, 216, 650, 654, 677, 678, 687

[56] References Cited

U.S. PATENT DOCUMENTS

| | | | |
|---|---|---|---|
| 3,634,809 | 1/1972 | Joly | 439/214 |
| 4,060,294 | 11/1977 | Haworth et al. | 439/215 |
| 4,199,206 | 4/1980 | Haworth et al. | 174/101 |
| 4,203,639 | 5/1980 | VandenHoek et al. | 439/210 |
| 4,231,630 | 11/1980 | Propst et al. | 339/22 R |
| 4,241,965 | 12/1980 | Wilson et al. | 339/4 |
| 4,277,123 | 7/1981 | Haworth et al. | 339/22 R |
| 4,295,697 | 10/1981 | Grime | 339/22 R |
| 4,313,646 | 2/1982 | Millhimes et al. | 439/654 |
| 4,367,370 | 1/1983 | Wilson et al. | 174/48 |
| 4,370,008 | 1/1983 | Haworth et al. | 439/165 |
| 4,376,561 | 3/1983 | VandenHoek et al. | 439/210 |
| 4,382,648 | 5/1983 | Propst et al. | 339/180 |
| 4,666,223 | 5/1984 | Tillmann | 339/32 R |
| 4,684,186 | 8/1987 | Hetherington | 439/171 |
| 4,740,167 | 4/1988 | Millhimes et al. | 439/654 |
| 4,775,328 | 10/1988 | McCarthy | 439/211 |
| 4,781,609 | 11/1988 | Wilson et al. | 439/215 |
| 4,918,886 | 4/1990 | Benoit et al. | 52/221 |

OTHER PUBLICATIONS

Advertising Bulletin for Esprit Seven.
Engineering Data Sheet/PDS-8106, Panel Concepts, Inc.
Steelcase Installation Directions.

*Primary Examiner*—Gary F. Paumen
*Attorney, Agent, or Firm*—Katherine A. Nelson

[57] ABSTRACT

A power distribution system for prewiring a modular wall panel unit with electrical conductors. The system is installed in the wiring channel that extends along the bottom edge of the panel unit. The system includes a power block located at each of the opposite ends of the panel wiring channel. Each power block comprises a housing containing ten flat, vertically aligned bus bars that are each connected to a separate one of four line, four neutral, a safety ground and an isolated ground conductors of the power supply of the site at which the panel unit is installed. Each power block is capable of receiving, at the end thereof adjacent the end of the wiring channel, on either or both faces thereof, a connector for a jumper cable for connecting two similar power distribution systems in adjoining panel units. Each power block is also capable of receiving, on either or both faces thereof, a duplex outlet unit or a power-in connector for connecting the bus bars of the power block to the separate conductors of the site power supply. The duplex outlet units are of two types which may each be installed in a power block in two different orientations to connect the outlet unit to a selected pair of the four different pairs of line and neutral conductors of the system.

23 Claims, 25 Drawing Sheets

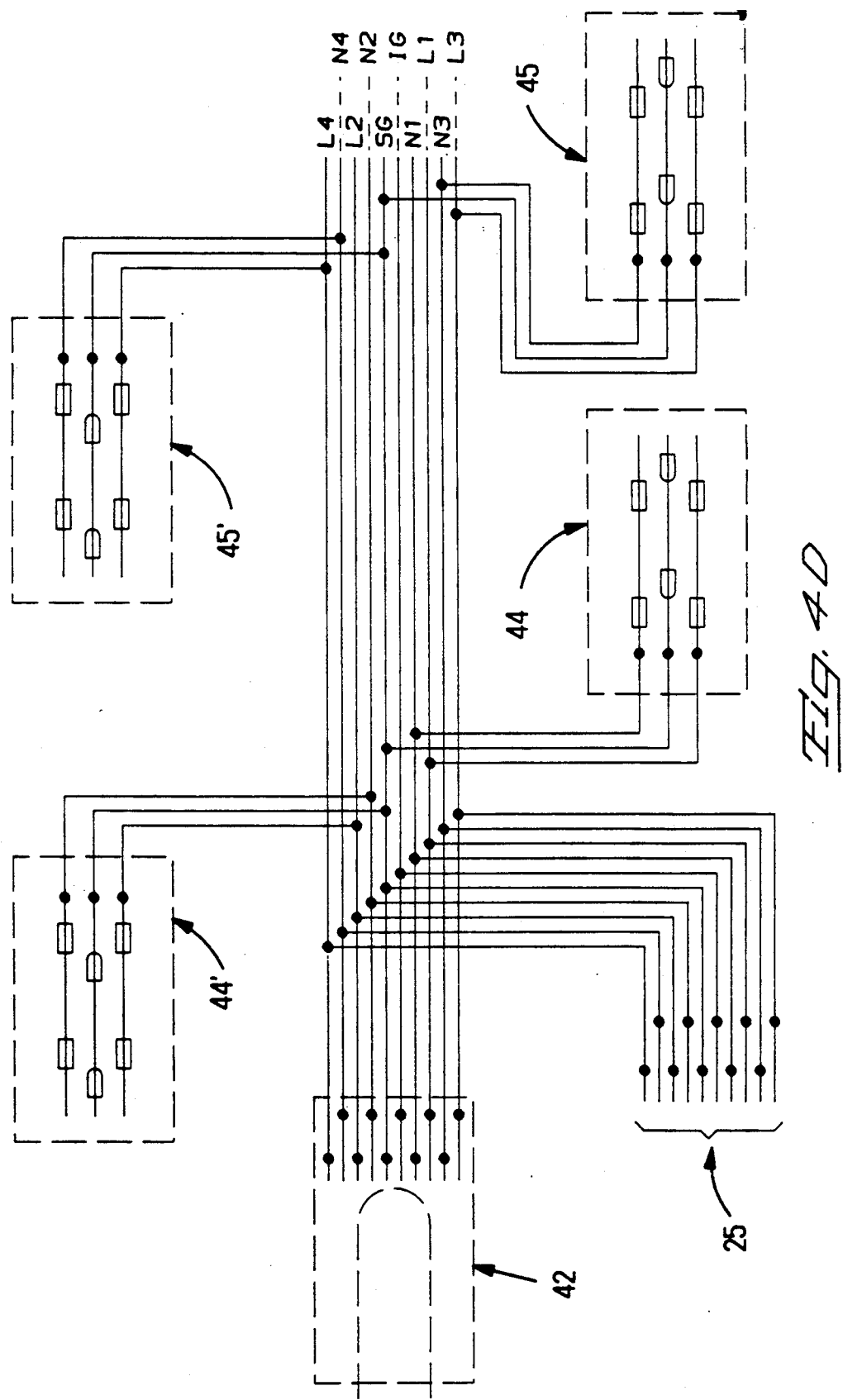

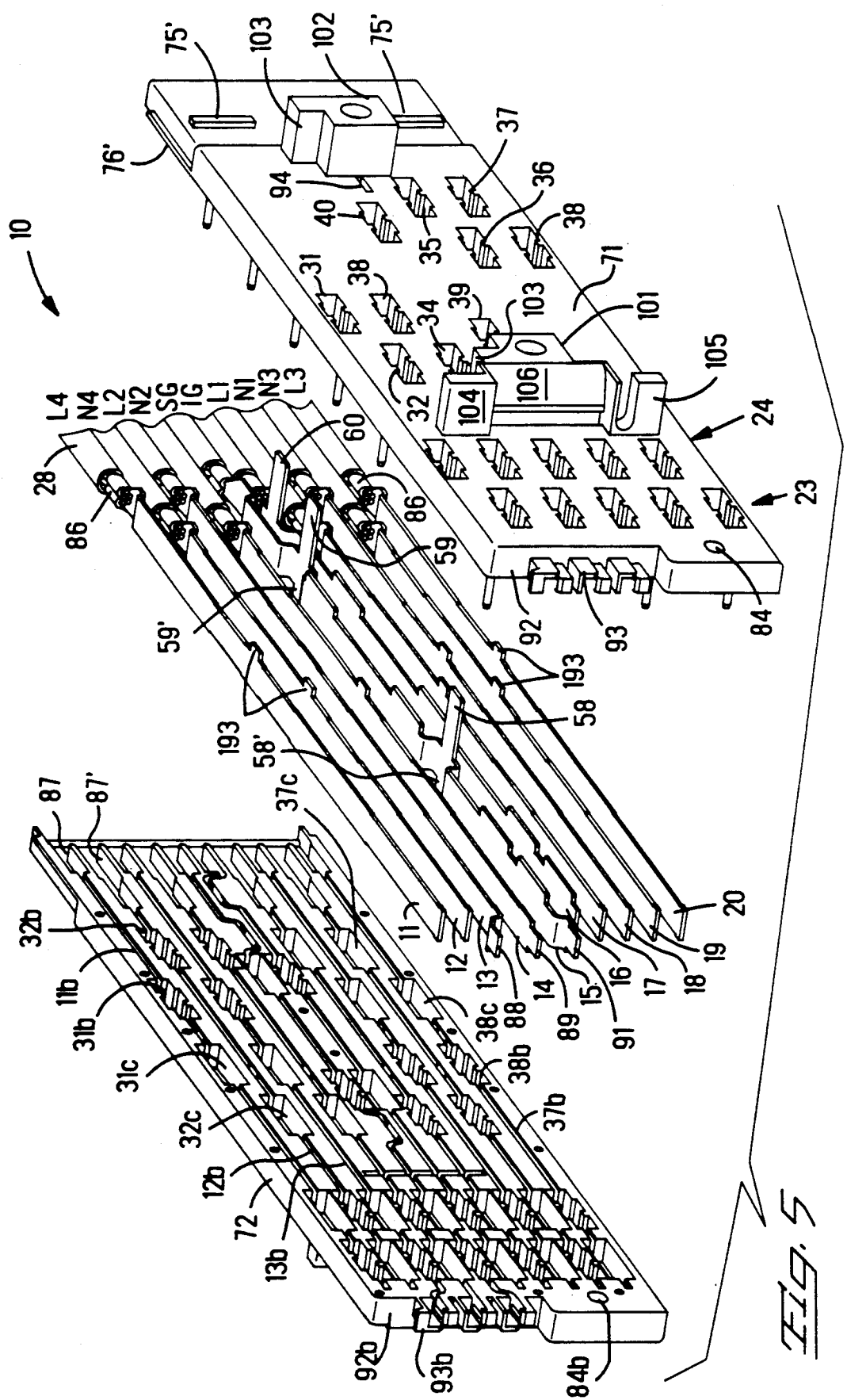

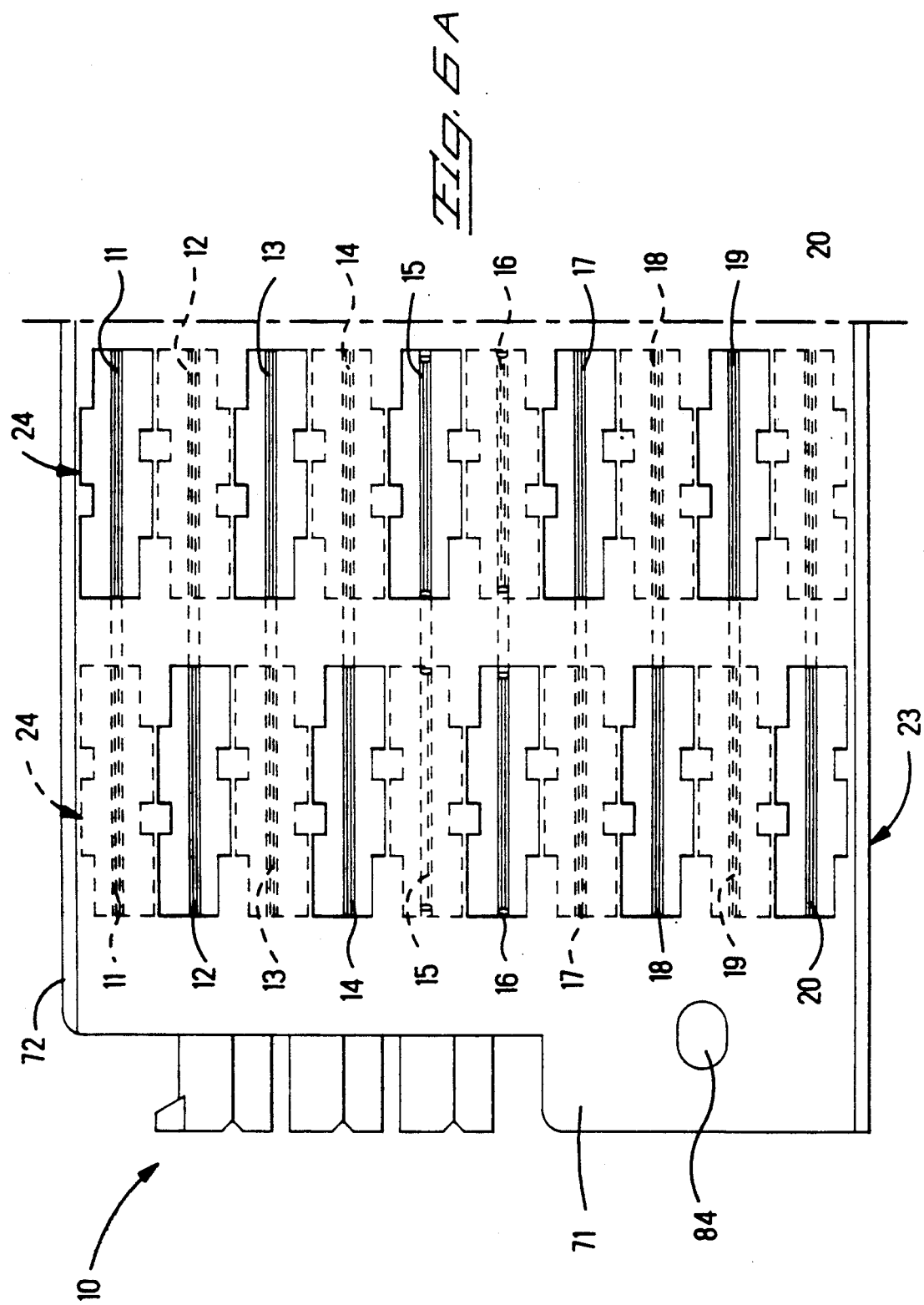

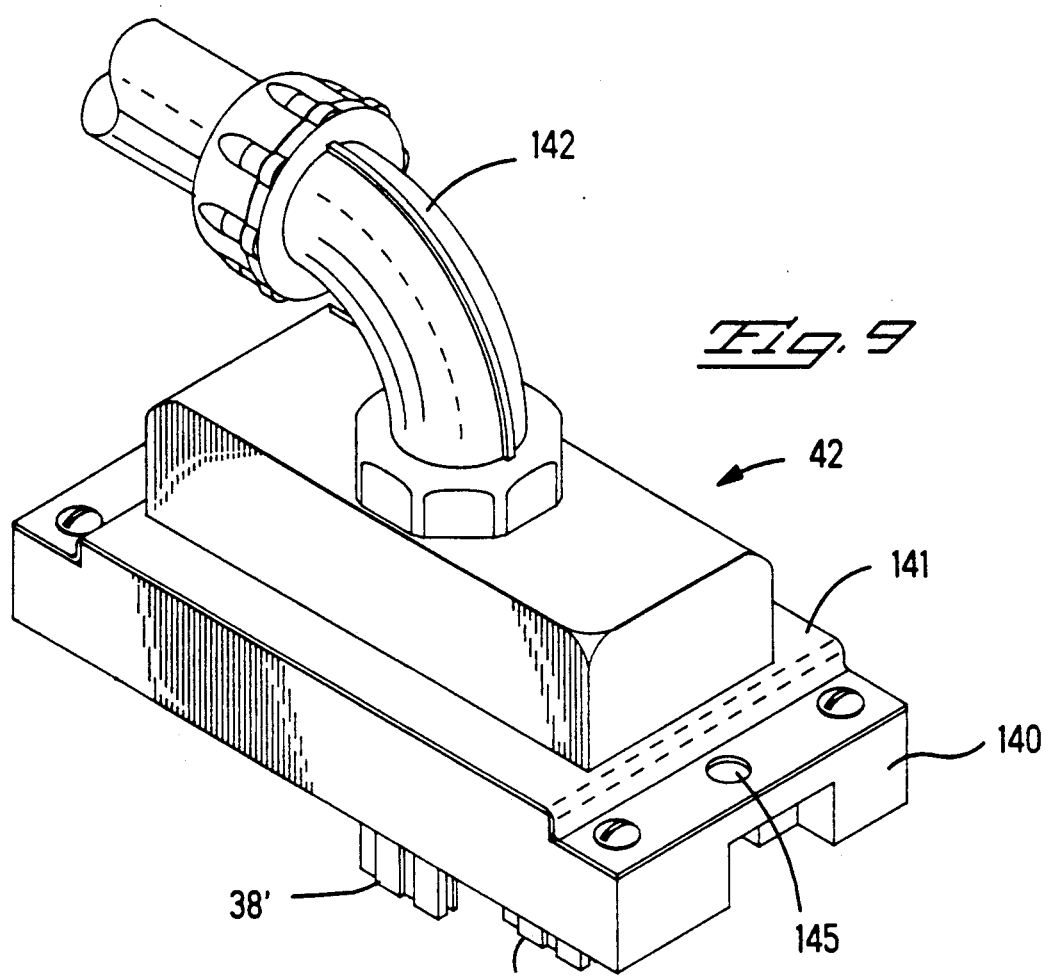
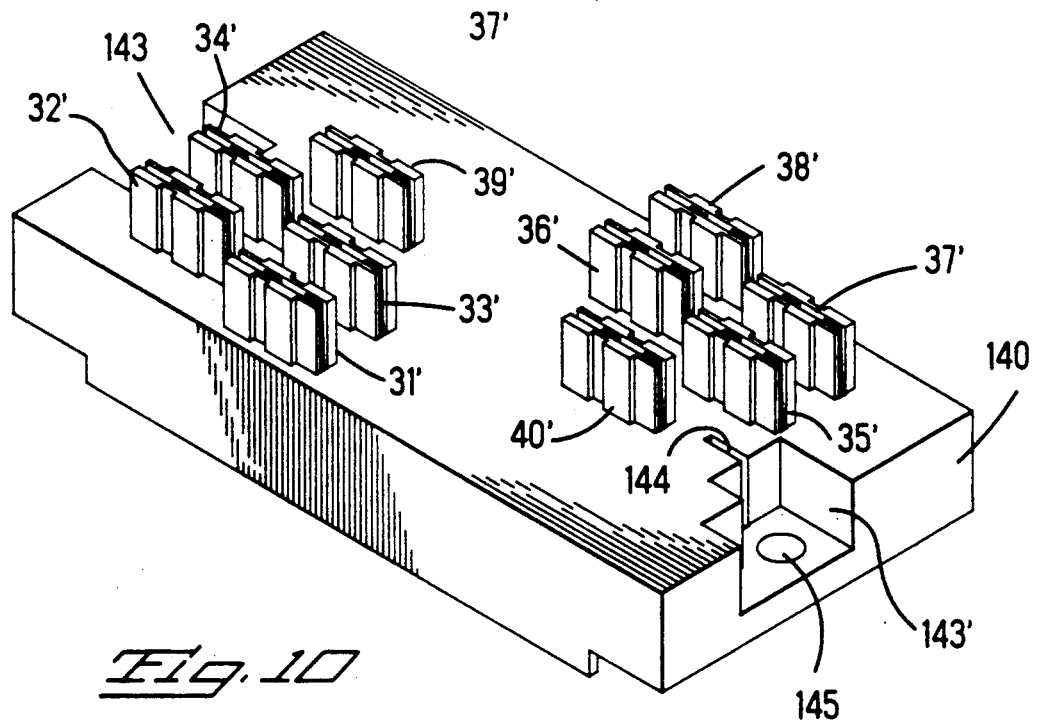

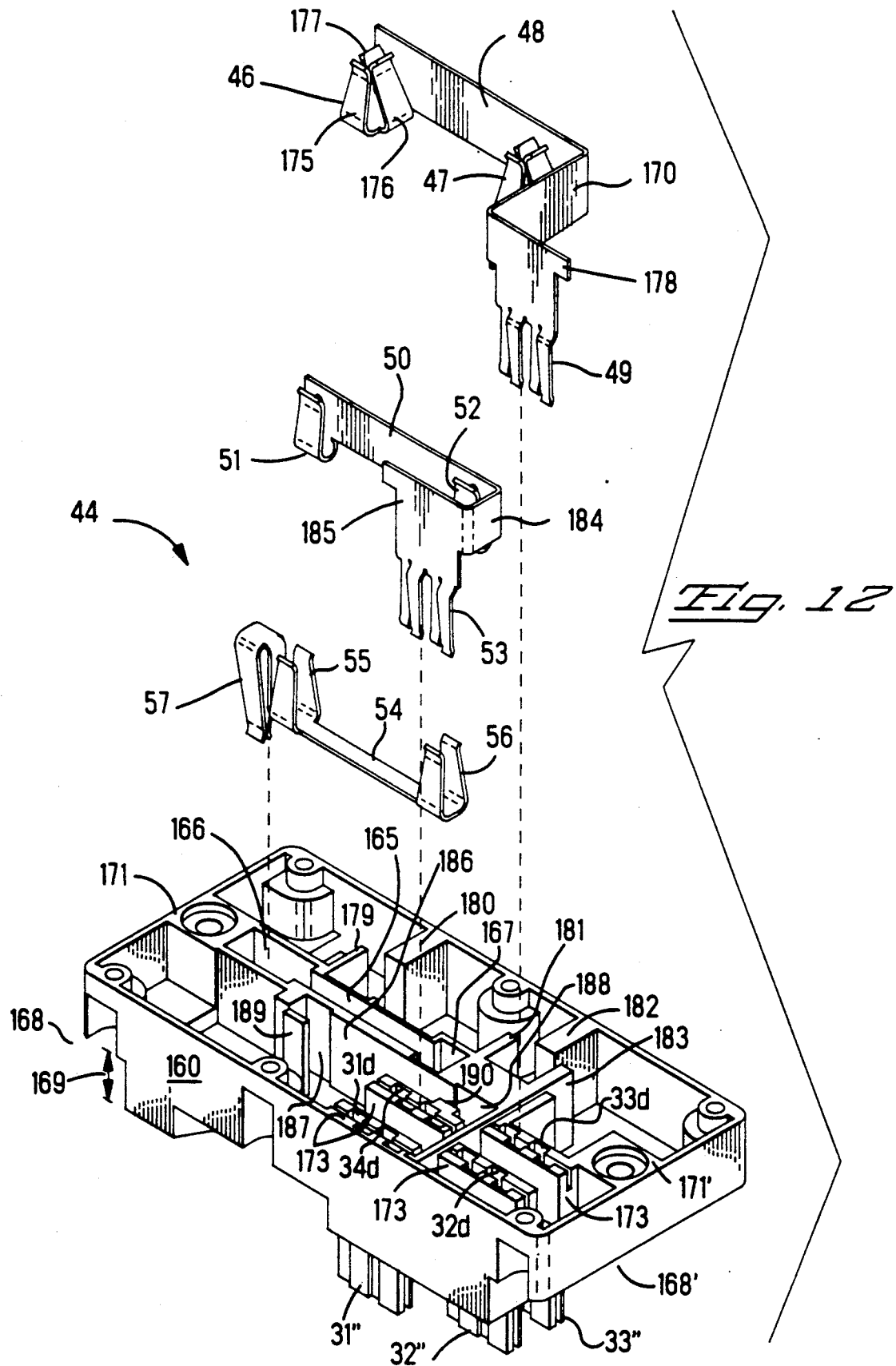

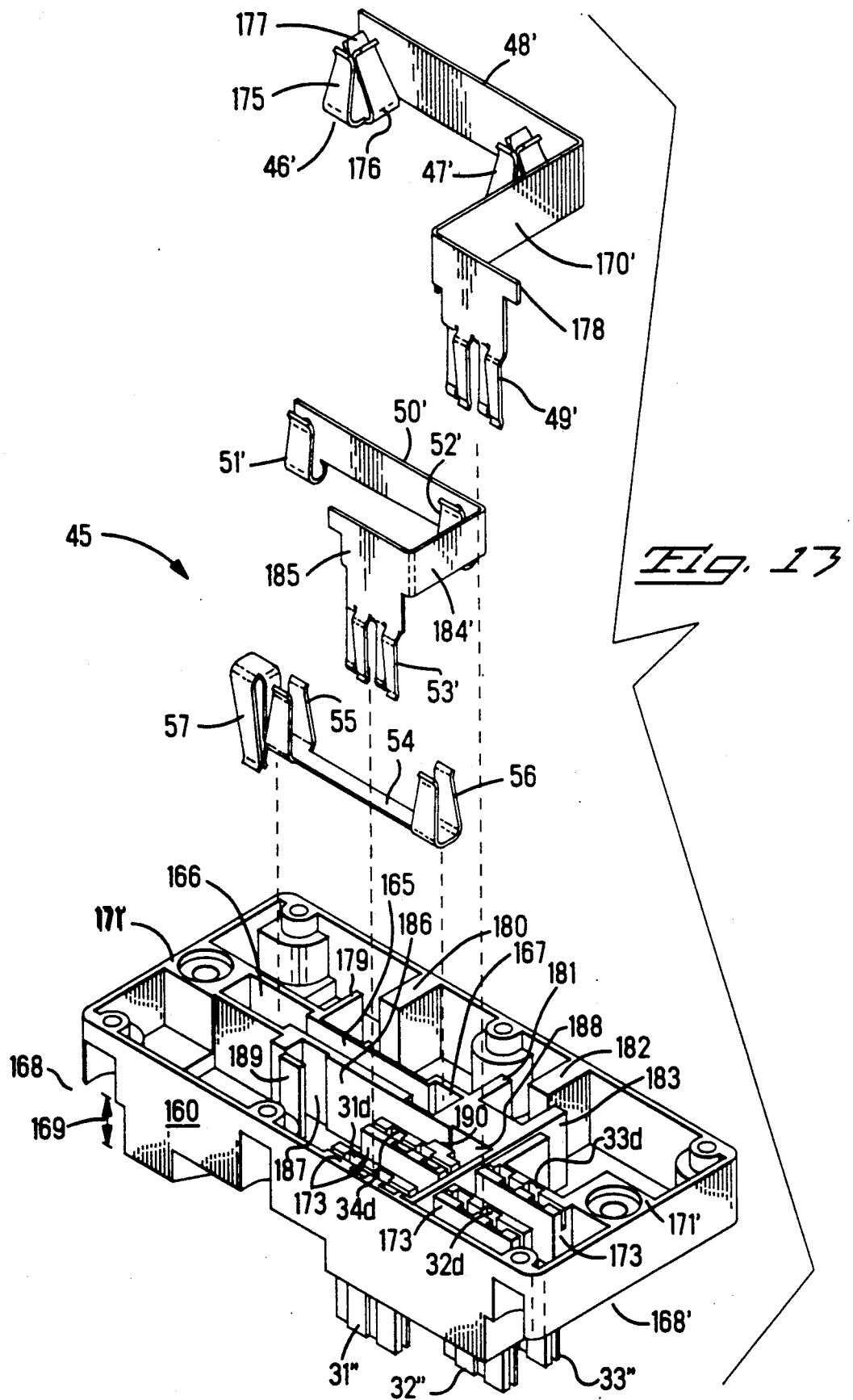

POWER DISTRIBUTION FOR MODULAR FURNITURE UNITS

This application is a continuation of application Ser. No. 07/539,284 filed 06/15/90, now abandoned, in turn, a Continuation of application Ser. No. 07/394,775 filed 08/16/89, now abandoned.

FIELD OF THE INVENTION

The present invention relates to a power distribution system for modular furniture units. More particularly, it relates to a system for prewiring modular furniture units which is capable of providing electrical power for as many as four duplex outlets per panel unit with each of the duplex outlets, at the choice of the user, being supplied by (a) separate pairs of line and neutral conductors, or (b) the same pair of line and neutral conductors, or (c) a combination selectable from four separate pairs of line and neutral conductors, and which further provides a safety ground and an isolated ground conductor, neither of which serves to carry any of the load currents to the outlets.

BACKGROUND OF THE INVENTION

Modular furniture units such as for example wall panels are widely used in architectural design, especially for commercial establishments, because of the advantages they provide in ease of installation, convenience of rearrangement of floor plans after installation, attractiveness of appearance, etc. One problem encountered in the use of modular wall panels is the provision of adequate electrical power for the areas enclosed by the panels while still retaining the advantage of flexibility in the location of the panels. This problem has been answered to some extent in prior power distribution systems disclosed, for example, in U.S. Pat. No. 4,060,294, issued Nov. 29, 1977 and related U.S. Pat. Nos. 4,370,008, issued Jan. 25, 1983 and 4,199,206, issued Apr. 22, 1980.

In the system of the above-referenced patents, identical power blocks are secured within the bottom edge of each panel unit adjacent the opposite ends thereof. The power blocks are interconnected by three conductors running the length of the panel within the bottom edge and are adapted to receive, on either of their opposite vertical faces, panel to panel jumper connectors or a power-in connector through which power is supplied by a three conductor cable from a branch circuit of the base power distribution system. The power blocks are further adapted to receive, on either vertical face, a duplex outlet connector through which outlet power is available to the areas enclosed by the panels. By these means, a duplex outlet may be provided at each of the opposite ends of a panel unit, and on both sides thereof, along the length of an indefinite run of panel units, limited by the permissible number of outlets that can be connected to a single branch circuit. When the number of outlets installed along a panel run has reached the permissible limit, it is necessary to break the continuity of the system and to begin a new run from a separate power-in connector leading from a different branch circuit of the power main.

Improvements over the three-wire power distribution system for modular panels have been devised to enable the installation of longer panel runs and the placement of a greater number of duplex outlets therein with fewer power-in connections from separate branch lines of the base power distribution system. Such improved systems are exemplified by the systems disclosed in U.S. Pat. Nos. 4,313,646, issued Feb. 2, 1982; 4,367,370, issued Jan. 4, 1983; and 4,740,167, issued Apr. 26, 1988. The systems of U.S. Pat. Nos. 4,367,370 and 4,740,167 employ power blocks at opposite ends of a panel unit which are adapted to receive connectors for panel to panel jumper cables, connectors for cables interconnecting the power blocks of a panel unit and for power-in cables, and duplex outlet connectors on the opposite vertical faces. In the system of U.S. Pat. No. 4,313,646, the power blocks are formed integrally with a single duplex outlet.

The feature in common of the '646, '370 and '167 patents is that each of the systems is supplied power through, and the power blocks are interconnected by, a five-wire cable. The base power distribution system may suitably comprise a three phase system and the five wires provide three lines, one shared neutral and one safety ground. The duplex outlets may be selectively connected between any one of the three available lines and neutral. The five-wire panel distribution systems enable the installation of panel runs having more than one circuit within a panel.

To overcome the limitation imposed by the load capacity of a shared neutral conductor, U.S. Pat. No. 4,781,609 issued Nov. 1, 1988, discloses a seven-wire power distribution system for modular panels providing three lines, three neutrals, one for each of the available lines, and one safety ground.

Increasing the number of conductors in a power distribution system for a panel originally designed to accommodate a three-wire power distribution system presents a challenge as to the manner in which the additional number of conductors are to be fitted into the available space. In the system of U.S. Pat. No. 4,781,609, the power blocks contain seven vertically aligned, parallel conductive plates. Each of the plates is formed with prongs projecting outwardly from both sides near one end of the plate and with two prongs spaced along the length of the plate projecting outwardly from opposite sides of the plate. Each of the projecting prongs is surrounded by an insulating shroud to protect against accidental contact. The vertical spacing between the plates is necessarily increased to provide space for the horizontal walls separating the vertically aligned insulating shrouds, so that the height of the power block extends substantially the entire available height of the wiring channel in the lower edge of the panel. Also, the outwardly projecting prongs and insulating shrouds increases the thickness of the power blocks, necessitating a reduction in the thickness of the duplex outlets used with the power blocks, if the faces of the duplex outlet units are to be maintained flush with the bottom edge of the panel unit.

The present invention comprises a ten-wire power distribution system for modular furniture units such as for example wall panels. The system provides four lines, four separate neutrals and two separate grounds, one of which comprises a safety ground for use by the outlet units of the system and the other of which comprises an isolated ground for use in specialized circuits.

It is an object of the invention to provide a ten-wire power distribution system for modular wall panel units which enables the installation of outlets at both ends of the lower edge of a panel unit, and on both sides thereof, with the four outlets being connected, at the choice of the user, (a) to separate pairs of line and neutral conductors, or (b) to the same pair of line and neutral conductors, or (c) to a pair of line and neutral conductors selectable from a combination of four separate pairs of line and neutral conductors.

It is another object of the invention to provide a ten-wire power distribution system for modular furniture units which is compact and space-saving in form to enable the system to fit within the space available in panel units of existing design.

It is another object of the invention to provide a power distribution system having provision for plug-in components in which the current carrying conductors thereof are at all times protected against accidental contact, including times during the insertion or removal of the plug-in components.

SUMMARY OF THE INVENTION

The invention comprises a ten-wire power distribution system for prewiring modular wall panel units which provides ready access to electrical power to the areas enclosed by the panels and which permits the construction of a run of panel units in a variety of configurations with the continuity of the power distribution system being maintained by conveniently installed plug-in jumper connections. The power distribution system is adapted to fit within the space available within the bottom edge of existing panel designs and includes provision for the placement of outlets, shown for purposes of illustration as duplex outlets, at both ends and on opposite sides of each panel unit. At the choice of the installer, each of the four possible outlets of a panel unit may be supplied power by separate pairs of line and neutral conductors, or all four outlet units may be supplied by the same pair of line and neutral conductors, or the four outlet units may be supplied from different combinations of the four separate pairs of line and neutral conductors. Both a safety ground conductor and an isolated ground conductor are included in the system. Each line and neutral conductor of the system accessible by the corresponding contacts of the plug-in components is at all times shielded against accidental contact, as are the contacts of the plug-in components.

Briefly, the distribution system includes, in each panel unit, a pair of identical power blocks, one each positioned near the opposite ends of a panel unit within the bottom edge thereof. Each power block is formed of insulating material and contains ten flat, rectangular bus bars extending in parallel the length of the block in vertical alignment. The two, centermost bus bars of the vertical array are the conductors for the separate safety ground conductor and the isolated ground conductor of the system. The two pairs of bus bars lying immediately above and below the centermost pair are the conductors for two of the four separate circuits of the system. The two outermost pairs of the vertical array are the conductors for the remaining two circuits of the system. Depending upon the width of the wall panel, the ends of the bus bars facing one another within the panel may be connected together by ten insulated wires spanning in parallel the separating length or in a narrow panel, the bus bars may extend essentially the full width of the panel.

Near the end of each of the power blocks adjacent the end of a panel unit are two vertically aligned, parallel columns of openings in both faces of the insulating covers. There are five openings in each of the columns. The openings of each column are aligned with alternate ones of the bus bars so that access to each of the bus bars is available through a separate one of the openings from either face of the power block. The periphery of each of the openings is formed with a notched or crenellated outline to bar against accidental contact with the underlying bus bar and to provide a keyed access for entry of an insulating shroud of complementary form surrounding male contacts on a plug-in component. The two columns of five openings provide access to the bus bars by the male contacts of a connector for a panel-to-panel jumper cable. The male contacts of the jumper cable connector are arranged in two parallel columns corresponding to the columns of openings in the power block. Each male contact set comprises four fingers formed along the edge of a conductive plate and projecting outwardly therefrom. When brought into engagement, the fingers extend transversely across the width of a bus bar and alternately contact opposite surfaces of the bus bar.

Along the face of the power block housing are ten notched openings eight of which are arranged in four vertically aligned columns of two openings each and the remaining two are spaced along the horizontal center line. One pair of the four columns is positioned in the lower right-hand quadrant of the power block face and the other pair of the columns is symmetrically positioned in the diagonally opposite upper left-hand quadrant of the power block face. Each of these openings is aligned with a separate one of the line or neutral bus bars within the power block to allow access to separate line and neutral conductors by a pair of male contacts carried by a plug-in duplex outlet unit or a base power-in connector as described below. The two centerline openings provide access to the safety ground an isolated ground bus bars.

The outlet units are provided in two types. A first outlet type carries a pair of male contacts arranged to engage one of the two pairs of line and neutral bus bars lying closest to the centermost pair of bus bars of the power block. When inserted into the power block with one orientation, the male contacts engage the pair of line and neutral bus bars closest above the centermost pair of bus bars. When this first type of outlet unit is turned end-to-end and inserted in the power block, the male contacts thereof engage the pair of line and neutral bus bars closest below the centermost pair of bus bars. The second type of outlet unit differs from the first type in that the male contacts of the second type are arranged to engage the outermost pair of line and neutral bus bars of the power block. When inserted in the power block in one orientation, the male contacts of the second type of outlet unit engage the lower outermost pair of line and neutral bus bars. Turned end-to-end and inserted in the power block, the male contacts of the second type of outlet unit engage the upper outermost pair of line and neutral bus bars.

These two types of outlet units may be installed in the four faces of the power blocks of a panel unit, each with a different orientation, so that the four outlet units are connected to four separate line and neutral pairs. Alternatively, the four outlet units may all be the same type installed in the same orientation, so that all four are connected to the same pair of line and neutral conductors. Again, different combinations of the two types of outlet units may be installed with different orientations to connect the four outlet units to selected pairs of line and neutral conductors in any combination obtainable from four separate pairs of line and neutral conductors.

Power is supplied to the panel power distribution system from the base power distribution system by a power-in connector which plugs into either face of the power block in the space provided for an outlet unit. The power-in connector includes eight sets of male contacts arranged in a pattern which combines the patterns of contact arrangements for both types of outlet units in both orientations thereof and includes two additional sets of male contacts for separately contacting the safety and isolated ground conductors of the system. The ten sets of male contacts of the power-in connector are wired through a suitable conduit to the four separate line and neutral circuits, the safety ground and the isolated ground of the base power distribution system.

The arrangement of the contact points for the cable connectors of the system in two vertical columns, together with the four-finger male contacts of the connectors and other plug-in components permits the construction of a ten-wire power distribution system of reduced height. The placement of all contact points for the power blocks of the system substantially along the longitudinal center lines of the power blocks enables the construction of a power distribution system of reduced thickness. These reductions in height and thickness are vital to the enablement of construction of a ten-wire power distribution system capable of fitting within the available space of existing modular panel designs. Furthermore, the connectors and the arrangement of the parts thereof made in accordance with the invention are particularly suitable for electrical applications requiring high density arrays of contacts.

Alternative configurations of the units of the distribution system for use in wall panel units that are too narrow to accommodate the whole system are also disclosed.

BRIEF DESCRIPTION OF THE DRAWINGS

FIGS. 3A and 3B are isometric drawings illustrating details of the protective metal sheath covering the wires interconnecting the power blocks.

FIG. 4D is an electrical schematic diagram of the power distribution system.

FIG. 5 is an isometric drawing of an exploded power block showing the internal construction thereof.

FIG. 6A is a fragmentary portion of the assembled power block illustrating the arrangement of the openings on the opposite faces thereof, with the arrangement of the openings on the rearward face being in phantom.

FIG. 9 is an isometric drawing of a front view of a base power-in connector through which the panel power distribution system is supplied power from the base power distribution system.

FIG. 10 is an isometric drawing showing a rear view of the housing of the power-in connector shown in FIG. 9.

FIG. 12 is an isometric drawing showing the interior of the housing used in both types of duplex outlet units and the placement therein of the contacts to form one of the two types of outlet units.

FIG. 13 is a drawing similar to FIG. 12 except that the contacts shown in FIG. 13 are fashioned differently from those of FIG. 12 to form the second type of outlet unit, used in the invention.

DETAILED DESCRIPTION OF THE PREFERRED EMBODIMENT

Details of the construction of the preferred embodiment of the invention will next be described generally with reference to FIGS. 1 to 3. For purposes of illustration, the modular furniture unit is shown as a wall panel and the outlet units are shown as duplex receptacles. It is to be understood the system can be used in no--panel modular furniture units as well as wall panels. It is to be further understood that the system may be used for other receptacles such as simplex, triplex, etc. In the preferred embodiment, each panel unit in a modular wall system includes a pair of identical power blocks, 10, 10', one each positioned near the opposite ends of a panel unit within the bottom edge thereof. Each power block provides means to interconnect with adjacent wall units and generally two duplex outlet units for providing interconnection to desired electrical equipment. A base power-in connector 42, shown schematically in FIG. 4D and in detail in FIG. 9, replaces one of the duplex outlets in one panel unit to supply power for the system.

Figure 1:
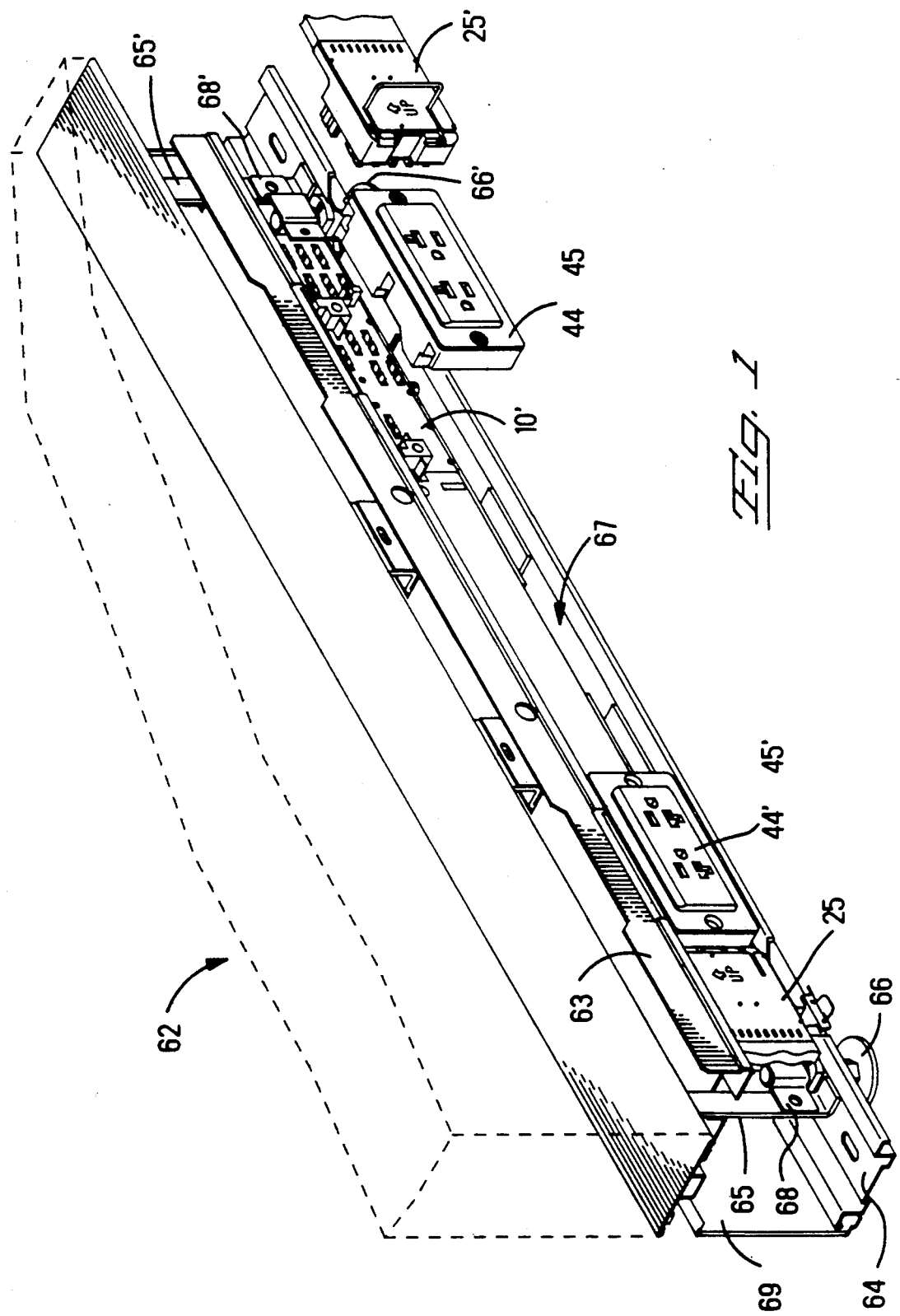
FIG. 1 is an isometric drawing of the system of the invention showing the system installed within the bottom edge of a modular wall panel unit.

FIG. 1 is an isometric drawing showing the power distribution system 67 of the invention installed within the bottom edge of a typical modular wall panel unit 62. In this Figure, the power block 10 at the left edge of the panel is obscured by the panel to panel or jumper cable connector 25 and the duplex outlet unit 44 or 45. At the opposite end of the panel, the jumper cable connector 25 and the duplex outlet unit 44 or 45 are shown separated from the power block so that the underlying power block 10' may be seen. The power blocks at each end of the panel unit are capable of receiving, on both sides of the panel, a jumper cable connector 25 and a duplex outlet unit 44 or 45.

Figure 2:
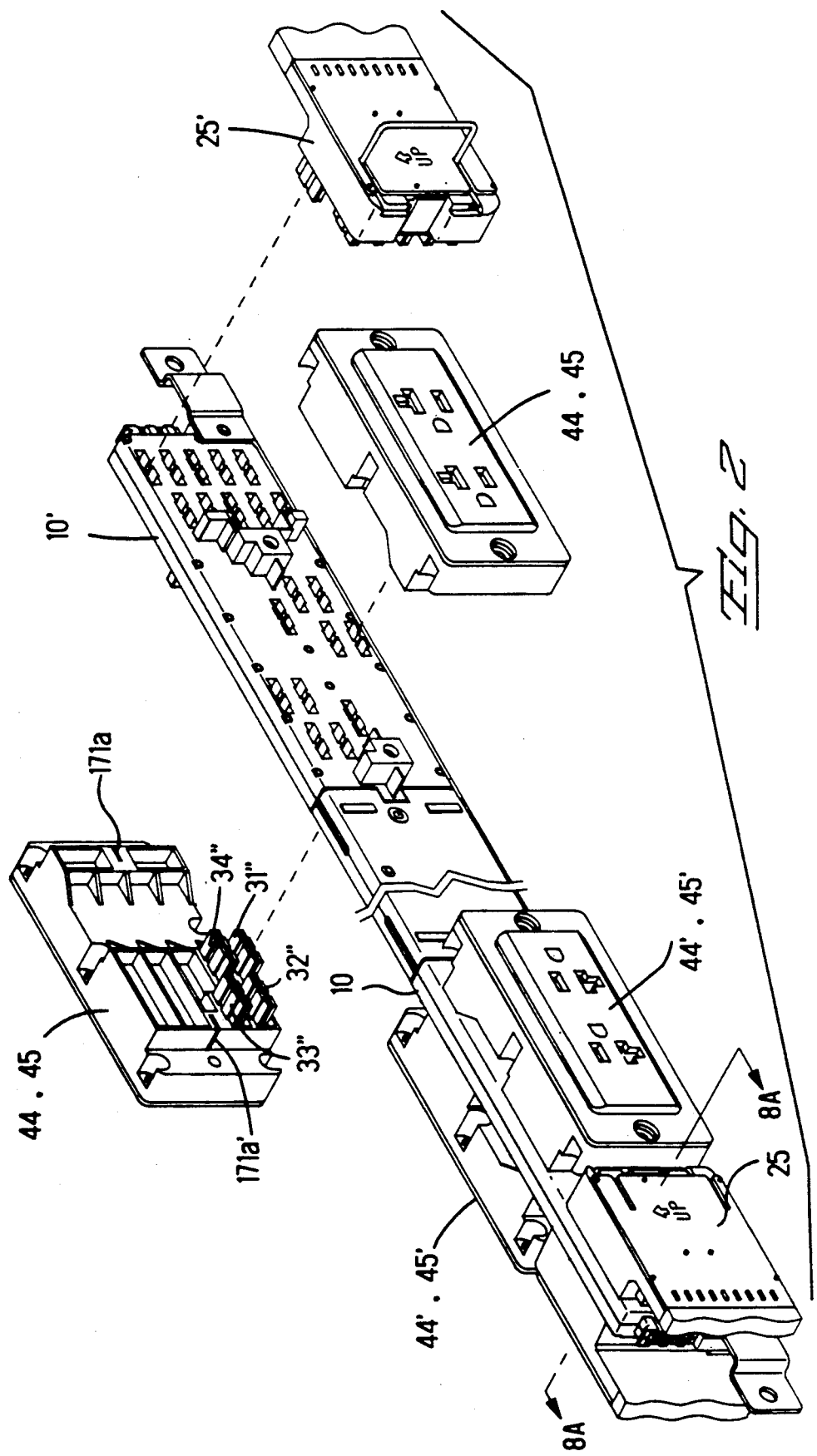
FIG. 2 is an isometric drawing of the invention showing the system as assembled prior to installation in a wall panel unit with duplex outlet units and a jumper cable connector installed in both sides of a power block at one end of the system and the placement of jumper cable connector and duplex outlet units for installation in the power block at the opposite end of the system.

FIG. 2 is an isometric drawing showing the power distribution system removed from the wall panel unit. This figure shows duplex outlet units of either 44 or 45 installed in both faces of the left-hand power block 10 and the orientation of outlet units of either 44 or 45 for installation in both faces of the right-hand power block 10'. The orientation of a jumper cable connector 25 for installation in the front face of power block 10' is also shown. FIG. 3 is an isometric view of the system removed from the wall unit illustrating the two power units 10, 10', which are interconnected by wires (not seen) inside unit 73.

Figure 3:
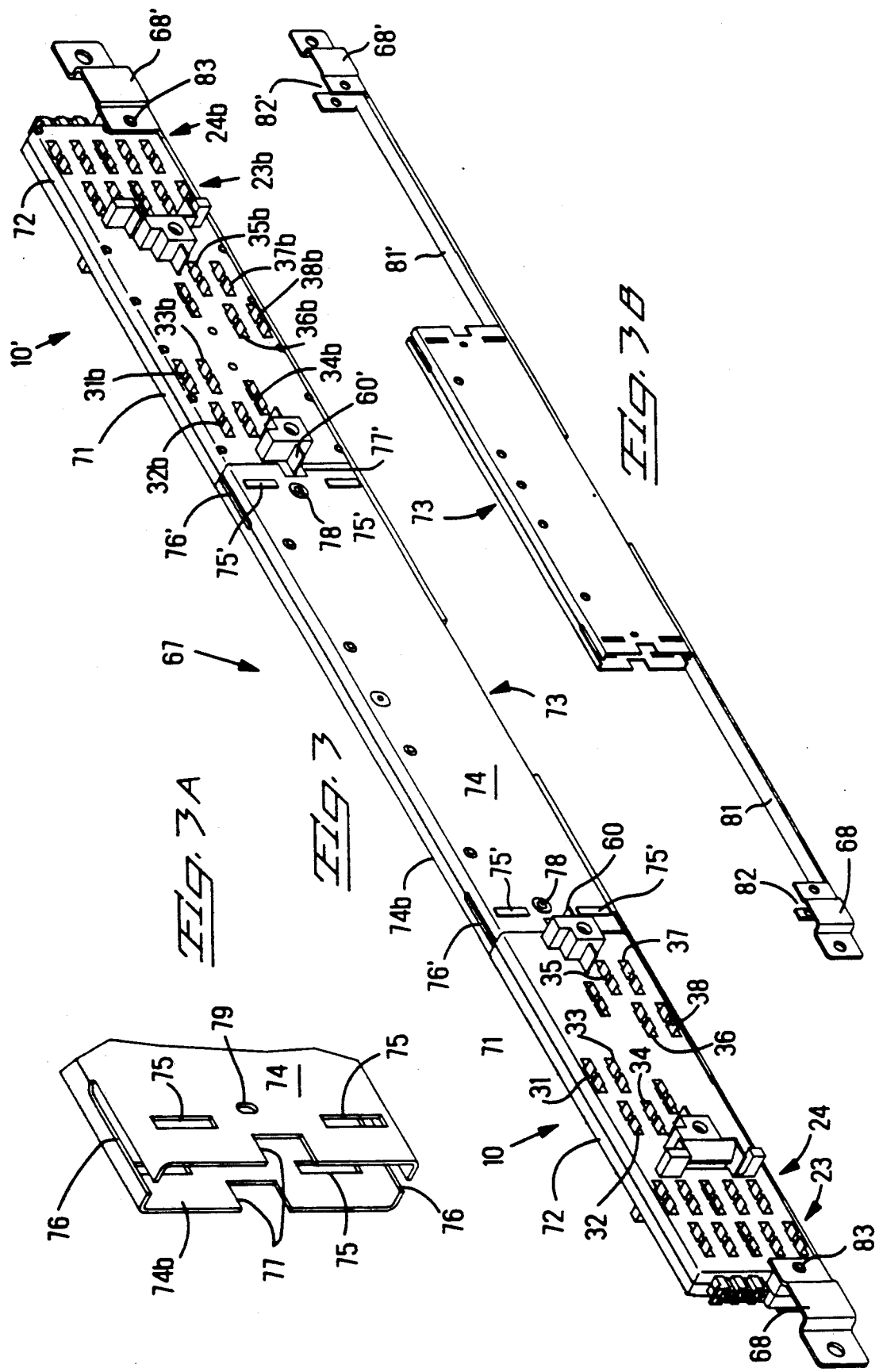
FIG. 3 is a view similar to FIG. 2 with the duplex outlet units and cable connectors removed from the power blocks.
Figure 4:
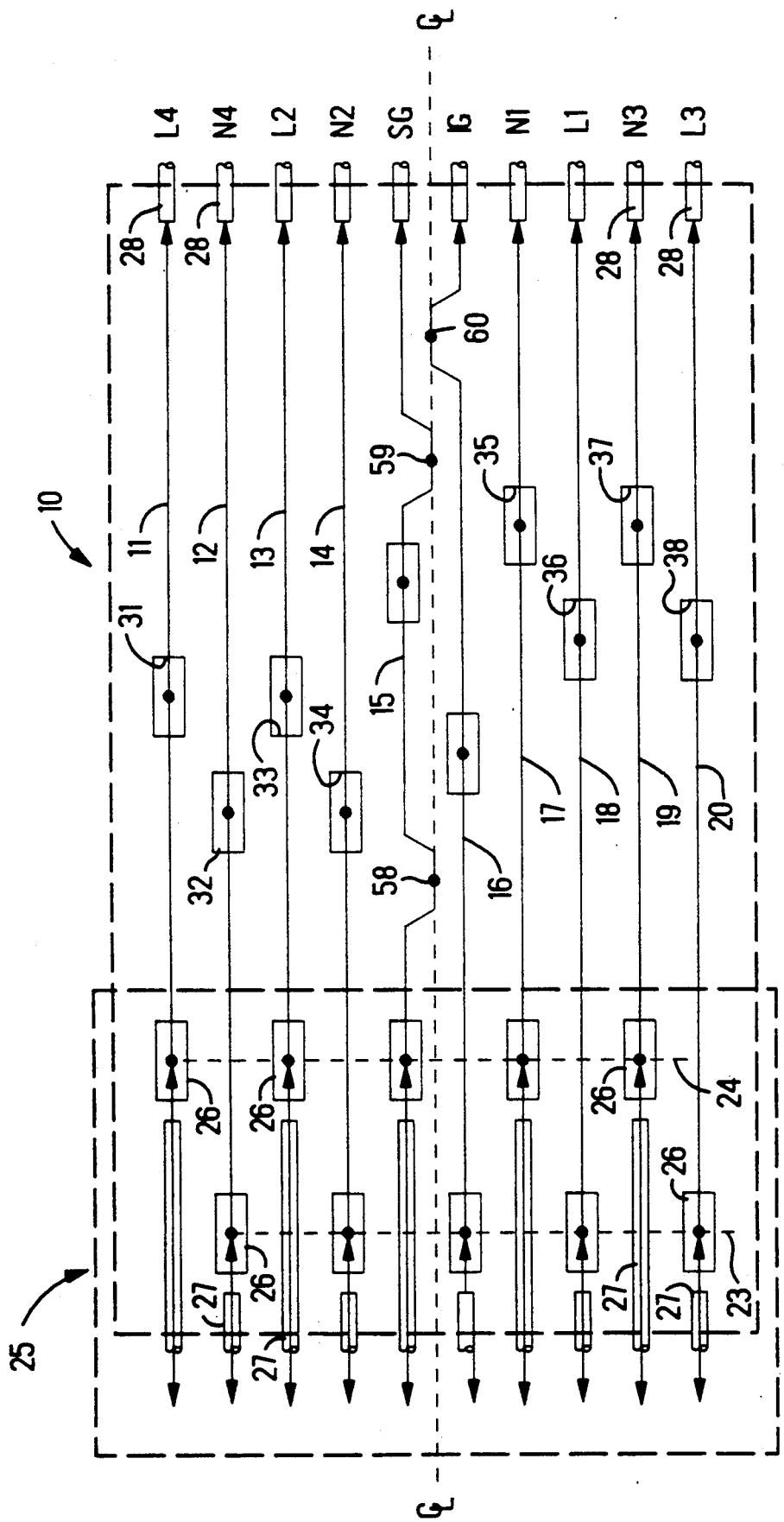
FIGS. 4 and 4A-4C are schematic diagrams of the power distribution system of the invention.

Referring now to FIGS. 3, 4, 4A-D, 5 and 6. A schematic diagram showing the electrical connections that can be made at one end of a modular wall panel unit in the ten-wire power distribution system of the invention is shown in FIGS. 4 and 4A-4C. FIG. 4D is an electrical schematic diagram of the system. As previously described, the system includes two identical, oppositely directed power blocks 10 and 10'. The power block housings are molded from insulating material in two mating half sections 71 and 72. Housing sections 71 and 72 are sometimes referred to hereinafter as the "front" and "rear" housing sections, respectively. In FIG. 3, the front housing section 71 of power block 10 faces forward, while the rear housing section 72 of power block 10' faces forward. The two mating halves 71, 72 of the power block form a thin, elongated box when assembled.

The wires 28, shown schematically in FIGS. 4 and 4D, interconnecting like ones of the bus bars of power blocks 10 and 10' are covered by a protective metal sheath 73 which spans the width of the panel unit separating power blocks 10 and 10', as best seen in FIG. 3. Sheath 73 is preferably formed from a single piece of metal which has been formed into a pair of upwardly extending side 74, 74b each of which includes slots 75-76, best seen in FIG. 3A, for receiving complimentary ridges 75'-76' molded on the facing ends of power block housing sections 71 and 72 (FIG. 5) and slots 77, which isolates sheath 73 from ground tangs 60, 60'. Several of the ridges 75' and a half portion of one of the ridges 76' are best seen in FIG. 5. The slots 75-76 and the ridges 75'-76' inserted therein locate sheath 73 properly with respect to power blocks 10 and 10' and increase the rigidity of assembly 67 when the sheath is assembled to the power blocks by fasteners 78 passed through holes 79 at the ends of sheath sections 74, 74b and aligned holes (not shown) at the ends of power block housing sections 71, 72.

The rigidity of assembly 67 is further increased by brackets 81, 81' (FIG. 3B) which include upstanding U-shaped brackets 82, 82' at the far ends thereof formed as part of assembly mounting brackets 68, 68'. Brackets 81, 81' are attached lower edge of sheath 73 at the opposite ends thereof and are attached to the far ends of power blocks 10 and 10' by fasteners 83 passed through holes in brackets 82, 82' and through aligned holes at the ends of power block housing sections 71, 72. Mating holes for receiving fastener 83 in power block 10 are shown in FIG. 5 at 84 and 84b.

Figure 6:
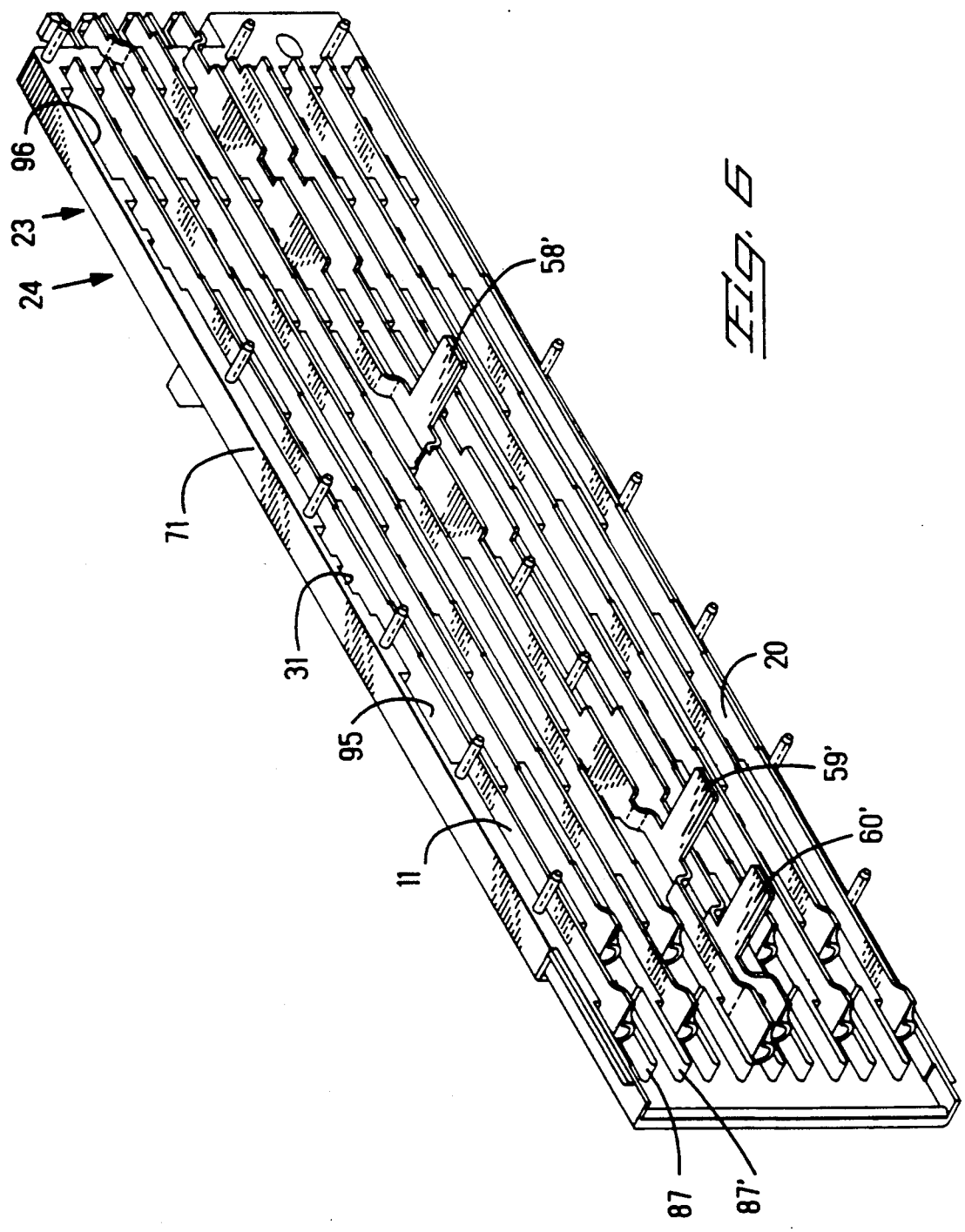
FIG. 6 is an isometric drawing showing one half-section of a power block with bus bars installed therein.

As best seen in FIGS. 5, 6 and 6A and represented schematically in FIGS. 4 and 4D, power block 10 contains ten parallel, vertically aligned bus bars 11-20. Access to these bus bars is provided by a series of openings in each of the housing halves 71, 72. One end of each half of the power block housing is pierced by a respective array 71b, 72b of ten openings arranged in two vertically aligned columns 23, 24 of five openings each. The openings of columns 23 and 24 in the face of the power block housing, as well as other openings later described, do not extend completely through both halves of the housing.

It is to be particularly noted that the chirality or handedness of the patterns of openings in the face of housing half 71 is preserved in the face of housing half 72, as best seen in FIG. 3. That is, the column 23 of openings lies to the left of openings column 24 in housing half 71 and the openings of column 23 are opposite the even-numbered ones of bus bars 11-20. Similarly, in housing half 72, the column 23b of openings, corresponding to column 23, lie to the left of openings column 24b and the openings of 23b are opposite the even-numbered ones of bus bars 11'-20' of power block 10', corresponding to bus bars 11-20 of power block 10. Also, the chiralities of the patterns of array 71a of openings 31-34 and 35-38 of power block 10 and the patterns of corresponding array 71b of openings 31b-34b and 35b-38b of power block 10' are the same. This preservation of chirality in the patterns of openings in the opposite faces of the power block housing enables any of the plug-in components of the system to fit in either face of the power block. It is to be noted, however, that while the patterns of the respective arrays 71a, 71b and 72a, 72b of openings in the housing halves 71, 72 have the same chirality, the housing halves 71, 72, are not, in themselves, right handed or left handed. The same members 71, 72 form both of the power blocks 10, 10'.

FIG. 5 is an exploded isometric view of power block 10 and FIG. 6 is an isometric view of the interior face of power block housing section 71. The ends of bus bars 11-20 of power block 10 facing the similar ends of the corresponding bus bars of the power block 10' at the opposite end of the panel unit are interconnected by ten insulated wires 28 extending in parallel across the width of the panel unit. As is shown in FIG. 5, the right-hand ends of bus bars 11-20 are each formed with crimp terminal 86 for attachment to the end of the wire 28 interconnecting the like bus bar in the power block at the opposite end of the panel unit. The odd-numbered ones of the bus bars 11-20 are slightly longer than the even-numbered ones so that each of the ten terminals 86 becomes alternately disposed in one of two vertically aligned columns, each of which contains five terminals 86. Preferably the bus bars are stamped from copper or a copper alloy and the edges of the bus bars are chamfered to facilitate mating of the contact members with the bus bars.

Referring now to FIGS. 5 and 6, bus bars 11-20 respectively fit into parallel channels 11b-20b of the rear half section 72 of the power block housing to a depth of half the width of the bus bars. Each of the channels 11b-20b diverges into an open-ended trough 87 or 87'. The odd-numbered ones of the bus bars 11-20 are slightly longer than the even-numbered ones and channels 11b-20b alternate correspondingly in length so that each of the troughs 87' is longer than each of the troughs 87. The terminals 86 of the longer ones of bus bars 11-20 are disposed in the shorter troughs 87 while the terminals 86 of the shorter ones of the bus bars are disposed in the longer troughs 87'. Front housing section 71 contains channels corresponding to and coincident with channels 11b-20b into which bus bars 11-20 fit to the remainder of their width when housing sections 71 and 72 are assembled. FIG. 6 shows bus bars 11-20 seated in the channels of housing section 71 corresponding to channels 11b-20b of housing section 72.

FIG. 6A is a fragmentary assembled portion of power block 10 illustrating the pattern of openings of rows 23 and 24 of housing section 71 and the pattern of openings 23, 24 on the outward face of housing section 72. For purposes of clarity, only the outline of the openings and those portions of the bus bars 11-20 accessible through the openings are shown in FIG. 6A. The openings and bus bars accessible from rearward face 71 are shown in phantom. As can be seen in FIG. 6A, the openings in column 23 provide access to the odd numbered bus bars and the openings in column 24 provide access to the even numbered bus bars. FIG. 6A clearly illustrates the internesting of the openings from the opposite faces of the power block.

Again referring to FIG. 5, the left-hand ends of bus bars 13, 14 and 15 are formed with narrowed tangs 88, 89 and 91 which project outward beyond the vertical edges 92, 92b of housing sections 71, 72. Tangs 88, 89, 91 are surrounded by an insulating silo molded in mating half-sections 93, 93b on the vertical edges 92, 92b of housing sections 71, 72. Silos 93 are contoured to mate with an L-shaped plug at the end of a three-wire cord extending upwardly within the vertical edge of a wall panel unit. Neither the plug nor the cord is shown in the drawings. The plug connects two of the cord wires, through tangs 88 and 89, to bus bars 13 and 14 for supplying power from L2, N2 circuit of the system to a lighting fixture or other device located along the top edge of the panel unit. The third wire of the cord is connected by the plug, through tang 91, to bus bar 15 for grounding the fixture.

Short tangs 193 project laterally from the facing edges of bus bars 11, 12, 14 and 16-20 to fit into detent recesses (not shown) in housing section 71 for longitudinally locating and restraining the respective bus bars in the channels of housing section 71 corresponding to channels 11b, 12b etc. Bus bar 13 is longitudinally located and restrained in channel 13b of section 72 and the channel corresponding to 13b in section 71 by the upward bend in the bus bar adjacent tang 88 which fits into conforming bends in channel 13b and the channel opposite thereto in section 71.

Bus bar 15 is formed with two downward offsets spaced along its length to move the plane of the portions of the bus bar within the offsets onto the longitudinal center lines of sections 71 and 72. Tangs 58 and 59 project outward from the facing sides of the offset portions bus bar 15, as seen in FIG. 5. Corresponding tangs 58' and 59' (FIG. 6) project outward from the opposite sides of the offset portions of bus bar 15. Tangs 58-59' extend through slots 94 in the faces of housing sections 71 and 72 where they are exposed for engagement by a ground contact of a duplex outlet unit 44 or 45, as described hereinafter. Only one of the slots 94 is visible in FIG. 5. An upward offset is formed in a portion of bus bar 16 near the end connected to one of the conductors 28 to move the plane of the offset portion onto the center lines of housing sections 71 and 72. Tangs 60 and 60' project outward from the opposite sides of the offset portion of bus bar 16 through slots 77 in the faces of housing sections 71 and 72, as shown in FIG. 3. Tangs 60 and 60' provide access to the isolated ground conductor of the system for contacts of a specialized plug-in component (not described herein) used to supply power to electronic equipment requiring a dedicated ground conductor.

As shown in FIGS. 1-3, 5 and 6A, the openings of columns 23, 24, and 31-40 in the face of housing section 71 for receiving the male contacts of the various plug-in components are formed with a crenellated or notched periphery to protect against accidental contact with the bus bars accessible through such openings. The male contacts of the plug-in components which engage the bus bars through such openings are each surrounded by insulating silos, as seen on components 44,45 in FIG. 2, having outlines of complementary form to the outlines of the openings, also for the purpose of protecting against accidental contact with the male contacts during installation of removal of the plug-in component. These safety features will later be more fully described. The outline form of the openings is mentioned at this time because wherever a recess with a notched wall is shown in one of the housing sections 71 or 72 in FIGS. 5 and 6, it is indicative that recess is open to the face of the housing in which it is shown.

For example, opening 31 in the face of housing section 71 is formed with a notched wall. When housing section 71 is assembled to housing section 72, a straight-walled cavity 31c in housing section 72 lies directly opposite opening 31. Cavity 31c is closed at the bottom and is provided to receive the portion of the insulating silo of a male contact extending over bus bar 11 when a male contact is inserted through opening 31. Similar straight-walled cavities, such as 32c, 37c and 38c, are positioned in housing section 72 directly opposite the openings in the face of housing section 71. Only a few of such cavities have been labelled in FIG. 5. Straight-walled cavities corresponding to cavities 31c, 32c etc. are positioned in housing section 71 directly opposite the openings 31b, 32b etc. in housing section 72. The cavities of section 71 are only partially seen in FIG. 6, at 95 and 96. The internesting of the openings and respective cavities are shown in FIGS. 6A, 8A and 15-19.

Mounting posts 101 and 102 for securing in place either a duplex outlet unit 44 or 45 or a base power-in connector 42 project outward from the face of housing section 71. Posts 101 and 102 fit into complementary recesses in the rear face of the housing for a duplex outlet unit and in the rear face a power-in connector. Posts 101 and 102 are formed with a step 103 molded into the upper facing corners thereof for polarizing a power-in connector 42 when such a component is installed in the power block. The right-hand side of post 101 is formed with upper and lower wings 104, 105 which are offset longitudinally from the portion of post 101 of similar shape to post 102. The side wall of post 101 connecting wings 104, 105 is formed with a stepped ramp 106 which serves as a strike for a latch toggle formed on the end of the housing of a connector 25, as later described. Posts similar to posts 101 and 102 are molded onto the face of housing section 72, except that the post on section 72 similar to post 101 will be seen to the right and the post similar to post 102 will be seen to the left when section 72 is viewed in elevation.

Figure 7:
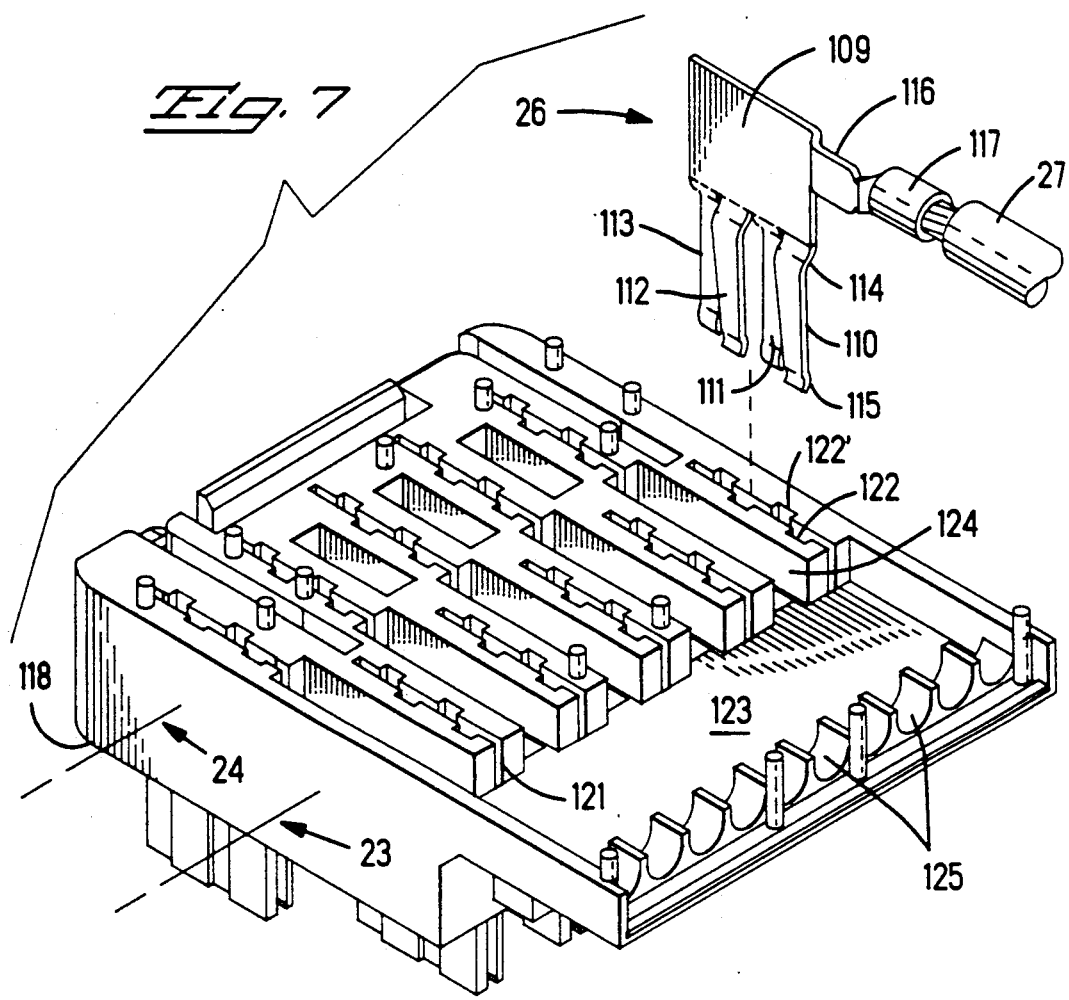
FIG. 7 is an isometric drawing of a front view of the housing of a jumper cable connector with the cover plate removed.

Details of the construction of plug-in panel to panel component 25 will be described with reference to FIGS. 3, 4, 4D, 7, 7A and 8. As shown in FIGS. 3 and 4, the openings of columns 23, 24 are aligned with alternate ones of the bus bars 11-20 to enable the individual engagement of each of the bus bars by ten separate male contacts 26 carried by a plug-in connector 25 for a flexible ten-wire panel to panel jumper cable 126, as best seen in FIGS. 7 and 8. The male contacts of connector 25 extend outward from the rear face of the connector housing and each contact is enclosed by an insulating silo dimensioned to fit with minimum clearance within the openings of the power block housing. Each of the male contacts 26 of connector 25 is connected by a separate one of the conductors 27 of the jumper cable 126 to a similarly situated male contact of an identical connector (not shown) at the opposite end of the jumper cable. The panel to panel jumper cable connections between the power distribution systems of adjoining wall panel units establishes circuit continuity between the panel units with the bus bars of all the power blocks of the system all having the same order of vertical array.

Referring now to FIGS. 7 and 8, which illustrate panel to panel or jumper cable connector 25, and particularly to FIG. 7, which best shows a male contact 26 of the same general configuration used in all plug-in component of the system. Contact 26 preferably is stamped and formed from a strip of resilient conductive alloy of generally rectangular shape and having the desired electrical and mechanical properties as known in the art. The lower portion of the strip is formed into four parallel fingers 110-113 depending from a back beam 109. Each of the fingers 110-113 is bent out of the plane of beam 109 to form a spring arch 114 at the base of the finger which biases the free ends 115 of the fingers back into the plane of beam 109 when the finger ends are displaced therefrom. The directions of the bends of arches 114 alternate from side to side of the plane of beam 109 along with length of the beam. The tips of the free ends of the fingers are bent outward from the plane of beam 109 to facilitate passage of the fingers over the edge of a bus bar in one of the power blocks of the system when brought into contact therewith. Upon engagement with a bus bar, the fingers 110-113 alternately extend over and exert pressure upon the opposite surfaces of the bus bar, which then becomes threaded through the fingers along the plane of beam 109.

The form of construction of the contacts 26 is conservative of space and provides the further advantage that the reaction forces of the fingers 110-113 upon beam 109, when the fingers are in engagement with a bus bar, generate counterbalancing torques within beam 109. Therefore, upon engagement with a bus bar, the contacts do not exert any reaction force upon the housing in which the contacts are mounted and do not depend upon such reaction forces for the maintenance of contact pressure upon the bus bar. Thus, the contact pressures do not lessen because of minor changes in the housing dimensions resulting from relaxation of the housing. The contacts 26, and similar contacts of the system that are attached to wire conductors, are formed with a tab 116 projecting laterally from the upper edge of beam 109 and having a crimp terminal 117 fashioned on the end for attachment of a wire 27.

Figure 7A:
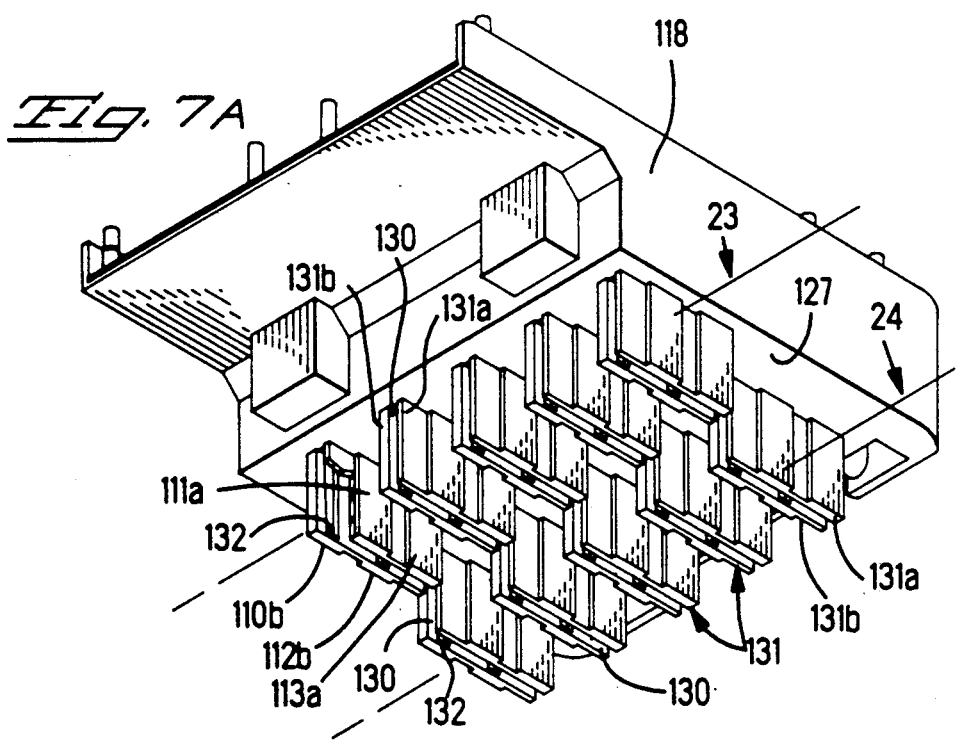
FIG. 7A is an isometric drawing of a rear view of the housing shown in FIG. 7.
Figure 8:
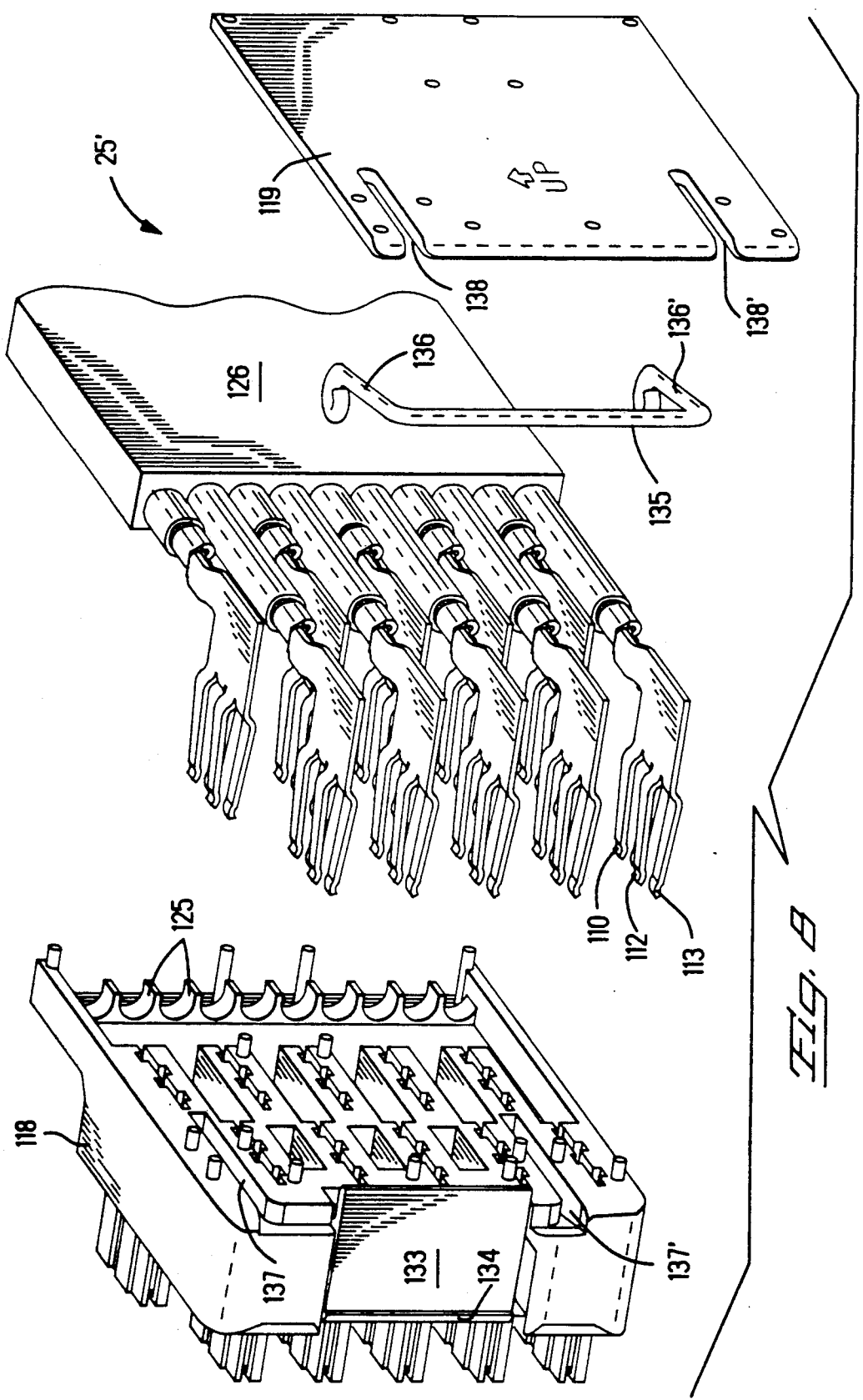
FIG. 8 is an isometric drawing of an exploded view of a jumper cable connector showing the placement therein of the contacts and wires of a ten-wire jumper cable.
Figure 8A:
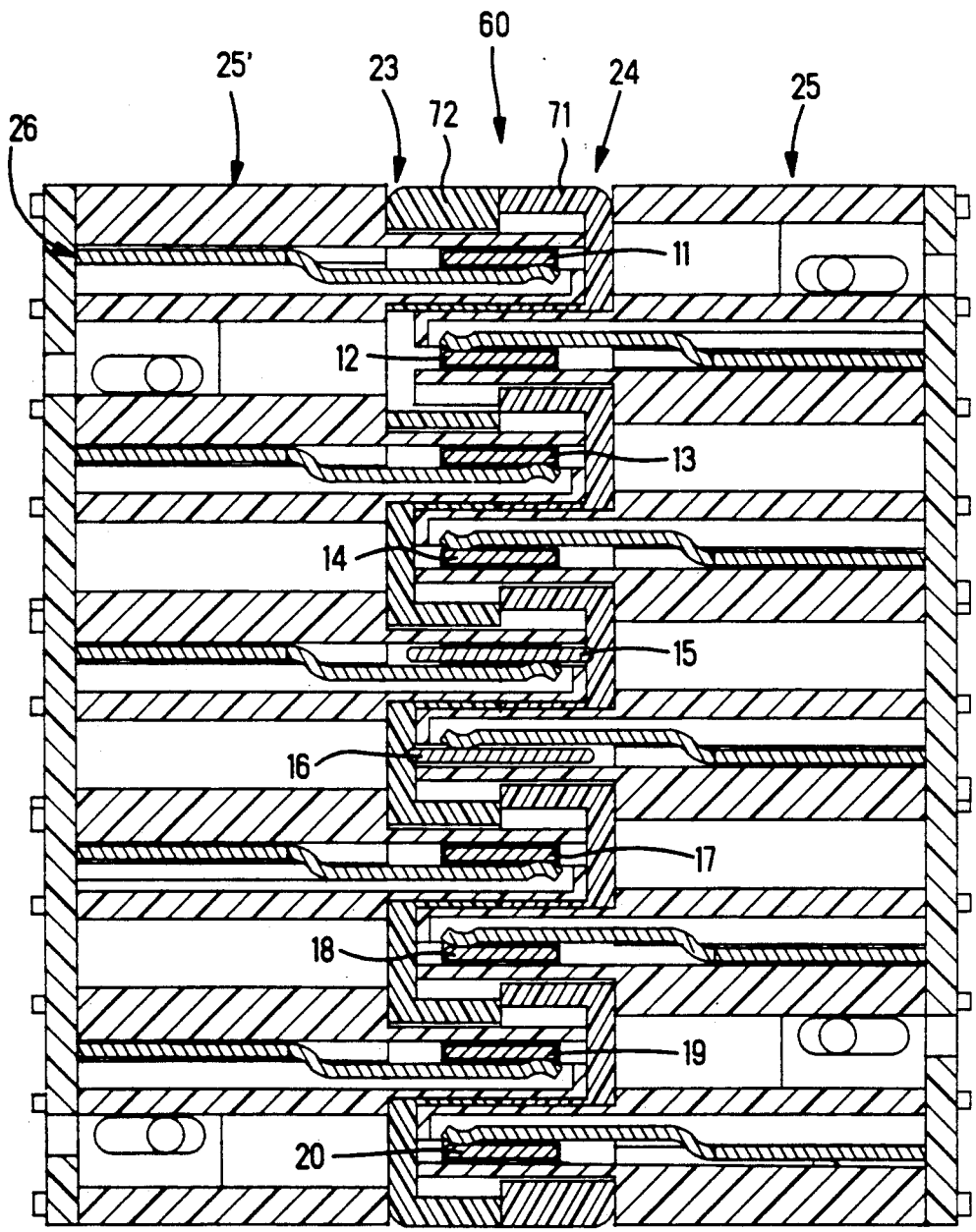
FIG. 8A is a cross-sectional view of two jumper cable connectors mounted to the power block.

Referring now to FIGS. 7, 7A and 8, the housing of connector 25 is comprised by a body section 118 and a cover plate 119, both molded from insulating material. The interior of body section 118 contains ten slots 121, arranged in two parallel columns 23 and 24 corresponding to the openings in power block 10, each column having five slots each, for receiving the ten contacts 26. The slots 121 are open along the lengths of their bottoms through the rear face of housing section 118 and are open at the end to the interior of section 118. The sides of slots 121 are grooved, as at 122, 122', to provide clearance for the spring arches 114 of the contact fingers 110-113 when a contact 26 is inserted therein. The ends of the slots of column 23 open into the edge of a box-like cavity 123 at the end of body 118 adjacent the jumper cable. The slots of column 24 open into the ends of channels 124 which extend in parallel between the slots of column 23 into the edge of cavity 123. The outer edge of cavity 123 is finished with ten aligned U-shaped spacers 125 which maintain the ten wires 27 in parallel alignment after installation of contacts 26, with the wires 27 attached, into body section 118. The portions of the wires 27 extending between connectors 25, 25' at the opposite wire ends are encapsulated in a flexible polymer material to form a flat cable 126, as shown in FIG. 8.

As previously discussed with reference to FIGS. 3 and 5, the openings for receiving jumper cable contacts 26 in column 23 are to the left of those identified in column 24. To ensure electrical continuity between adjacent furniture units, connectors 25, 25' include polarizing features such that connector 25 can only be received in side power blocks 10, 10' and connector 25' in side 72 of the power blocks 10, 10', thus giving "right handed" and "left handed" connectors. Once connectors 25, 25' are terminated to cable 126, however, the "handedness" in effect disappears in that cable 126 can be used on either end of the panel 67 and on either side. For purposes of assembly, the covers of respective connectors 25, 25' are marked with an arrow to indicate geometric orientation.

Referring to FIGS. 7 and 7A, the fingers 110-113 of each of the contacts 26 extend through and beyond the rear face 127 of housing section 118 when the contacts are fully inserted in the housing. These contact fingers are surrounded by insulating silos 131 molded onto the rear face 127 of the housing. The structure of each of the silos 131, and similar insulating silos of other plug-in components of the system, is identical and comprises two opposed shells 131a and 131b spaced apart to provide a groove 130 of sufficient width to clear the thickness of a bus bar of a power block 10 or 10'. The walls of shells 131a and 131b are relatively thin and are convoluted to provide interior channels into which the fingers 110-113 extend with sufficient clearance to permit deflection of the fingers upon engagement with a bus bar. The exterior walls of such channels covering fingers 110-113 are seen, respectively, at 110b, 111a, 112b and 113a. The ends of such channels are covered by overturned lips 132 which extend to the edge of groove 130. The contact fingers are accessible only through groove 130 which is too narrow to permit entry by a one-quarter inch probe in accordance with U.L. requirements or by a human finger and thus the contact fingers are at all times protected against contact by a human hand.

The outlines of each of the various openings in the faces of the power block into which the silos 131 etc. are complimentary to the outlines of the periphery of the silos. The openings are so dimensioned that the silos will pass therethrough with close clearances and the silos are so dimensioned as not to require any gaps in the power block housing openings of such width as to permit entry, from any angle, of a quarter inch diameter blunt-ended test probe to a depth permitting any part of the probe end to contact the underlying bus bar. Therefore, the bus bars are also protected at all times against contact by a human finger, whether during installation or removal of a plug-in component or when no plug-in component is installed in the power block. Further details of the safety features are disclosed in co-pending application Ser. No. 07/394,602 filed Aug. 16, 1989 for "Low Profile Spring Contact With Protective Guard Means", owned by the assignees of the present invention and incorporated by reference herein.

Referring to FIG. 8, the end of connector 25 is fitted with a latch plate 133 attached to the connector by a flexible tongue (not seen) to enable fore and aft toggling of the latch plate. The edge of plate 133 adjacent the rear face of housing 118 is finished with a bevelled lip 134 which overrides ramp 106 (FIG. 5) of mounting post 101 on the power block housing and engages the lower edge of the ramp to lock the connector 25 in place upon insertion into a power block. The connector may be unlocked for removal from the power block by moving the outer edge of plate 133 forward to disengage lip 134 from the lower edge of ramp 106 and permit withdrawal of the connector from the power block.

Removal of a connector 25 from a power block is aided by a bail 135 the ends of which are bent back into parallel arms 136, 136' with loops formed at the ends. The bail arms 136, 136' fit into grooves 137, 137' in housing 118 and are pivotally retained therein by pins (not shown) passed through the arm loops. Slits 138, 138' in cover plate 119 coinciding with grooves 137, 137' permit fore and aft pivotal motion of bail arms 136, 136' when the cover plate is secured to the housing 118. Grooves 137, 137' open through the end of housing 118 so that when the connector is installed in a power block bail 135 may be folded flat against the housing with the middle portion of the bail extending over the outer surface of latch plate 133. In this position of the bail, latch plate 133 cannot be pivoted forward to disengage lip 134 from the lower edge of ramp 106. For removal of the connector from a power block, bail 135 is swung outward from the connector housing, permitting latch plate 133 to be toggled forward to release engagement with ramp 106 and providing a convenient handle for withdrawal of the connector from the power block. Further details of the latching and locking features are disclosed in co-pending application Ser. No. 07/394,591, filed Aug. 16, 1989, for "Latch and Locking Handle For An Electrical Connector", owned by the assignee of the present invention and incorporated by reference herein.

Details of the construction of the base power-in connector 42 will be described with reference to FIGS. 3, 4, 4A, 4D and 9 through 11A. As shown in FIGS. 3 and 4, the upper left-hand quadrant of the mid-portion of the face of the housing of power block 10 is pierced by four openings 31-34 arranged in two vertical columns of two openings each. Four openings 35-38 arranged in two vertical columns of two openings each are positioned in the lower right-hand quadrant of the power block housing in symmetry with the openings 31-34. Openings 31-34 are respectively aligned with bus bars 11-14 and openings 35-38 are respectively aligned with bus bars 17-20 and allow access to those bus bars by male contacts of a plug-in duplex outlet unit or a base power-in connector by which power from the base power distribution system is supplied to the panel power distribution system. Additional openings 39 and 40, respectively aligned with bus bars 15 and 16, to allow access to those bus bars by male contacts of a base power-in connector. It is to be noted that while only one base power-in connector 42 is required for a modular wall system, the power distribution system can readily accommodate interconnection with the power source in any of the furniture units adapted to receive a receptacle outlet, as described herein.

Figure 4A:
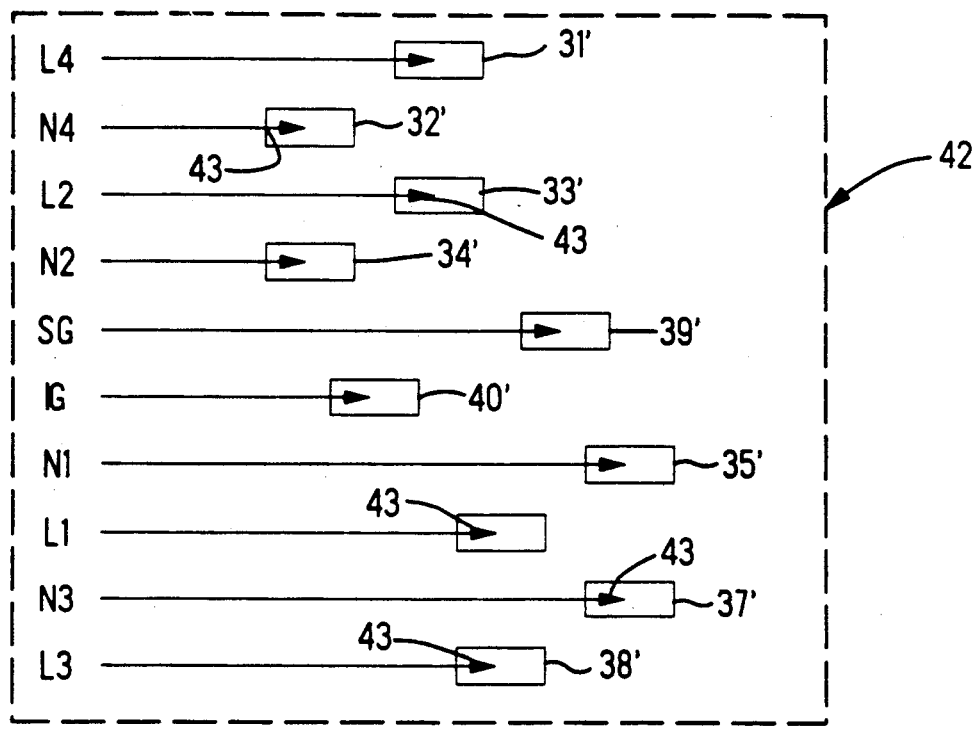

The base power-in connector 42, shown schematically in FIGS. 4A and 4D, is illustrated in detail in FIGS. 9-11A. FIG. 9 is an isometric drawing of the power-in connector 42 as seen from the front. The housing of connector 42 comprises a base section 140 of insulating material and a metal front cover section 141. The power-in connector includes ten insulated wires by which a set 43 (FIG. 4A) of ten male contacts, having essentially the same configuration as contacts 26 previously described with reference to FIG. 7, are connected to the base system. Each contact set is surrounded by one of ten insulating silos 31'-40' which are molded into the back face of the connector housing in a pattern that is congruent with the layout pattern of the openings 31-40. Each of the silos 31'-40' is dimensioned to fit with minimum clearance within one of the openings 31-40. For purposes of illustrating the invention, the contacts and their respective silos are arranged in the following order.

| Silo | Base System Conductor |
|------|----------------------|
| 31'  | Line 4 (L4)          |
| 32'  | Neutral 4 (N4)       |
| 33'  | Line 2 (L2)          |
| 34'  | Neutral 2 (N2)       |
| 39'  | Safety Ground (SG)   |
| 40'  | Isolated Ground (IG) |
| 35'  | Neutral 1 (L1)       |
| 36'  | Line 1 (L1)          |
| 37'  | Neutral 3 (N3)       |
| 38'  | Line 3 (L3)          |

When the power-in connector 42 is plugged into the face of power block 10, bus bars 11-20 become connected to the base power system in the same order as are the male contacts of connector 42. The wires connecting the set 43 of male contacts (not shown) of connector 42 to the base power distribution system pass through an opening in the face of cover 141 and are protected beyond the connector by metal conduit 142.

FIG. 10 is an isometric view of the rear face of the base section 140 of the housing of connector 42. The pattern of the arrangement of the insulating silos 31'–40' for the male contacts of connector 42 is clearly illustrated in FIG. 10. Because of the symmetry of the pattern in which silos 31'–40' are arranged, these silos could be fit into openings 31–40 or 31b–40b of the power block housing sections 71 or 72 (see FIG. 5), which is proper; or the connector could be turned end to end and silos 31'–40' could fit into openings 31–40 in reverse order, which is improper. Incorrect installation of connector 42 in a power block is prevented by shaping the recesses 143 and 143' at the opposite ends of base 140 with outlines which are complementary to the outlines of mounting posts 101 and 102, respectively, thus polarizing the connector. A slit 144 extends through the wall to the interior of base 140 along the center line of base 140 in each of the recesses 143, 143' to accommodate tangs 58 and 59 on the SG bus bar 15. Also seen in FIGS. 9 and 10 is a hole 145 through which a fastener is passed to secure connector 42 to mounting post 102. A similar hole is provided in recess 143.

Figure 11:
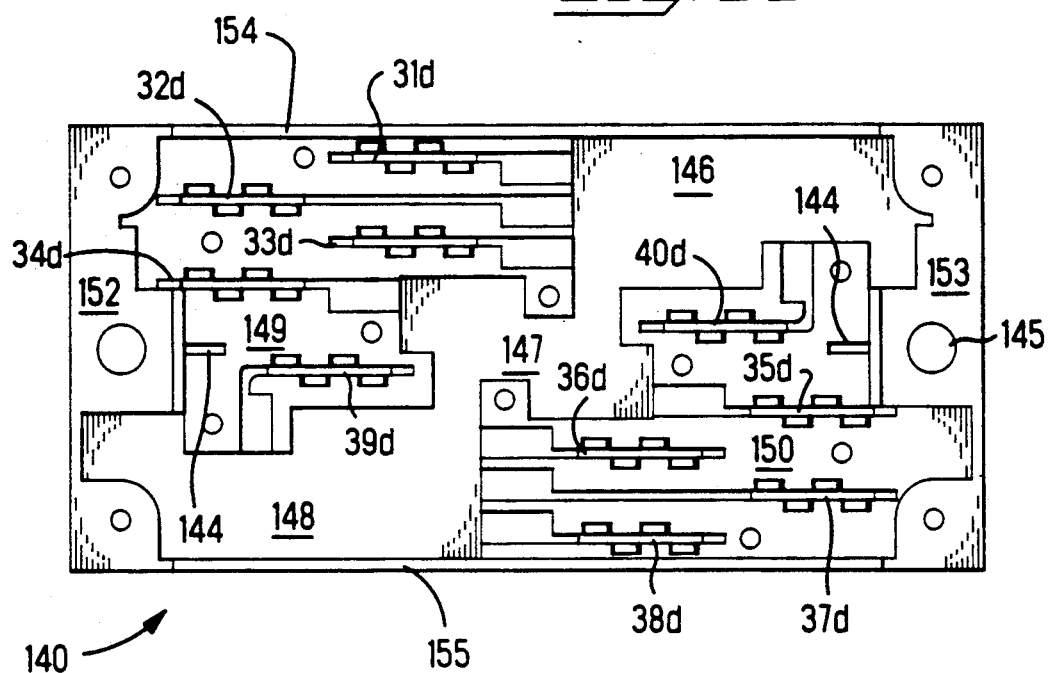
FIG. 11 is an elevation of a front view of the housing shown in FIG. 10.
Figure 11A:
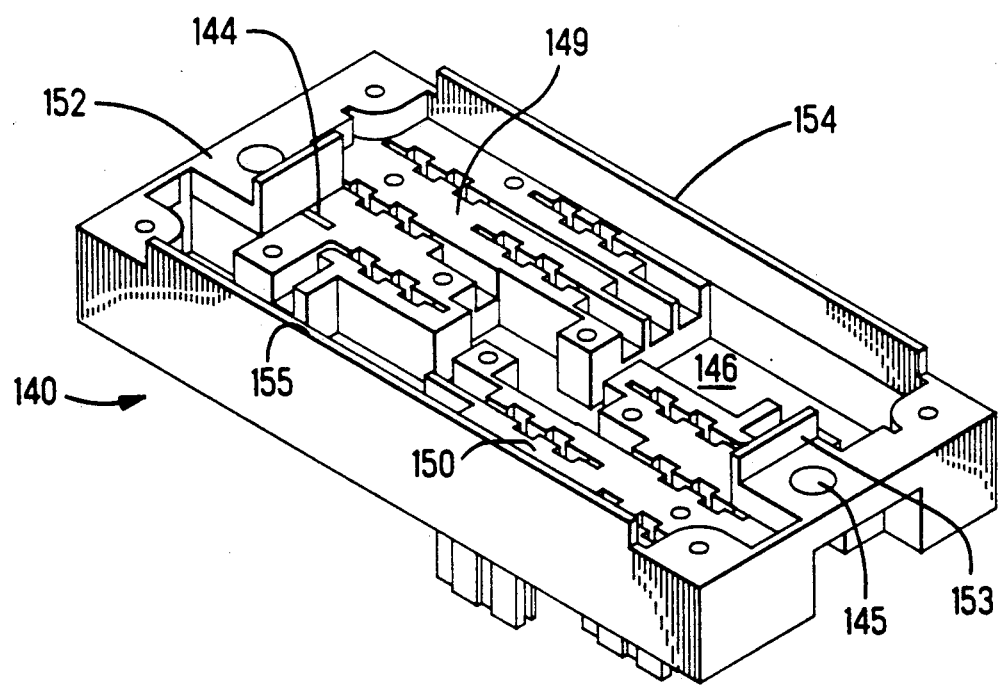
FIG. 11A is an isometric drawing of a front view of the housing shown in FIG. 10.

FIG. 11 is a front elevation of the base 140 of connector 42 and FIG. 11A is a front isometric view thereof, both showing the interior construction of the base. Base 140 may be considered to be formed in four levels of thickness. The lowest thickness level, or the areas in which the base is thinnest, are the floors of cavities 146, 147 and 148. The second thickness level may be considered to be the top plane of two diagonally opposite mesas 149 or 150 into which the various slits for receiving the male contacts of connector 42 are formed. The vertical edges of mesas 149, 150 define the walls of cavities 146–148. The third thickness level may be considered to be the top plane of the end areas 152 and 153 and the fourth thickness level may be considered to be the plane of the top edges of the side walls 154, 155 of base 140. These several levels of thickness of base 140 insure that space is available within the connector for the installation of ten sets of male contacts and their connecting wires.

Slits 31d–34d and 39d extend through mesa 149 and open to the rear face of base 140 at the locations thereon of silos 31'–34' and 39', respectively. Slits 35d–38d and 40d extend through mesa 150 and open to the rear face of base 140 at the locations of silos 35'–38' and 40', respectively. Slits 31d–40d and the male contacts which fit therein have an essentially identical configuration as the slits 122 and contacts 26 described with reference to FIG. 7.

Figure 4B:
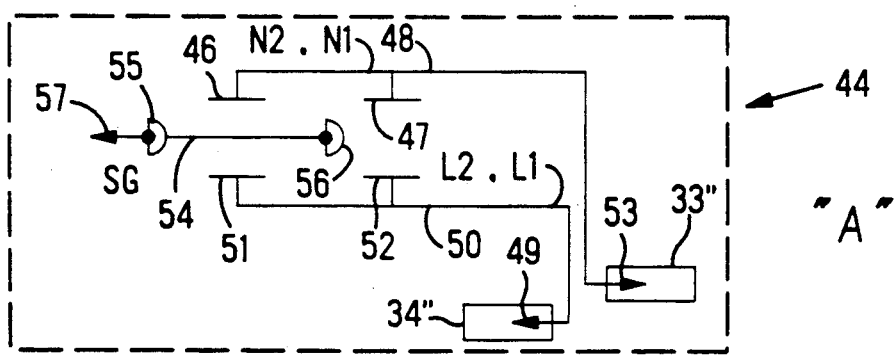
Figure 4C:
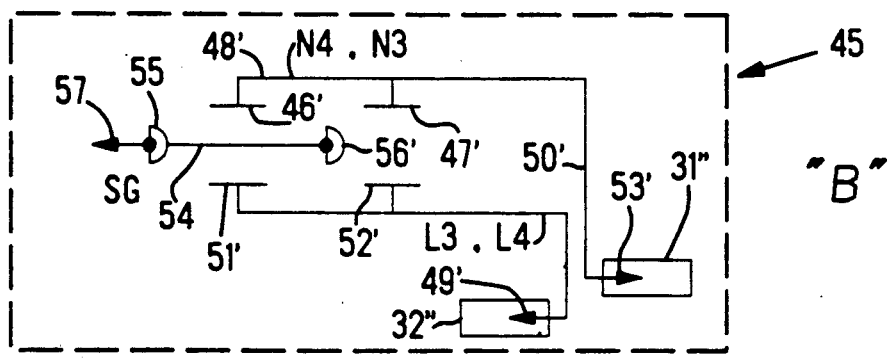
Figure 14:
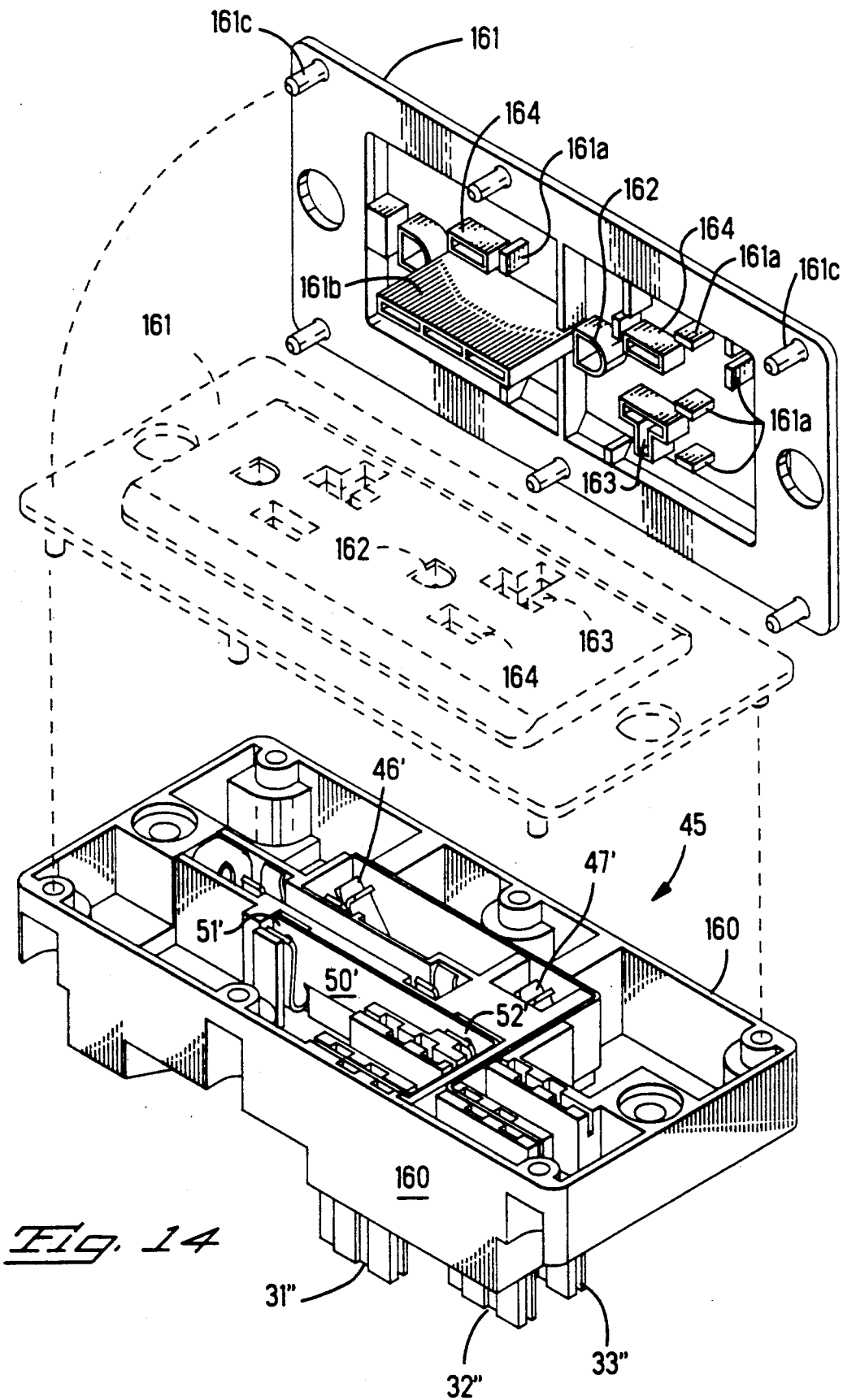
FIG. 14 is an isometric drawing of one of the two types of duplex outlet units used in the invention with the front cover exploded therefrom.

Assuming that circuit continuity with the base power system is established in the power block either by a jumper cable connected through a connector 25 to the energized power distribution system of an adjoining panel unit or by a power-in connector 42 connected to the power block 10', power block 10 is capable of accepting, on both faces, one of either of two types of plug-in outlet units 44 or 45, shown schematically in FIGS. 4B and 4C and in detail in FIGS. 12–14.

Outlet unit 44, hereinafter sometimes referred to as a type "A" outlet unit, is shown schematically in FIGS. 4B and 4D and in detail in FIG. 12. As described herein, outlet unit 44 is configured to provide electrical interconnection to either the L1, N1 conductors in a first orientation or to the L2, N2 conductors in a second orientation. Unit 44 includes male contacts 49, and 53, which are substantially identical to the male contact sets of connectors 25 and 42. Contacts 49 and 53 are surrounded by silos 33", 34" (See FIG. 2) in the same manner as previously described with respect to connectors 25 and 42. Silos 33" and 34" extend from a location on the back of the outlet housing that coincides, in one orientation, with openings 36 and 35 in the face of power block 10. When the outlet unit 44 is turned end to end, or "flipped", silos 33" and 34" coincide, respectively, with openings 33 and 34 of the power block housing. Thus, when outlet unit 44 is installed in power block 10 in the first orientation, contacts 49, 53 engage bus bars 17, 18 respectively thus connecting outlet contacts 46, 47 to the N1 conductor of the system and outlet contacts 51, 52 to the L1 conductor of the system. Installed in the second orientation, contacts 49, 53 engage bus bars 13, 14, respectively connecting contacts 46, 47 to the N2 conductor of the system and contacts 51, 52 to the L2 conductor of the system.

Outlet unit 45, sometimes referred to hereinafter as a type "B" outlet unit, and shown schematically in FIGS. 4C and 4D and in detail in FIGS. 13 and 14, is substantially similar to outlet unit 44, except that the male contacts 49' and 53' thereof, corresponding to contacts 49 and 53 of outlet unit 44, are contained within insulating silos 32" and 31", which extend from the back of the housing of unit 45 from positions that coincide with openings 38 and 37 in one orientation of unit 45. Turned end to end or "flipped" to a second orientation, the positions of silos 31", 32" coincide, respectively, with openings 32 and 31 of power block 10. Thus, when outlet unit 45 is installed in power block 10 in the first orientation, contacts 49', 53' engage bus bars 19, 20, respectively connecting outlet contacts 46', 47' to the N3 conductor of the system and outlet contacts 51', 52' to the L3 conductor respectively. When outlet unit 49 is installed in the power block 10 in the second orientation, contacts 49', 53', engage bus bars 12, 11, respectively thus connecting contacts 46', 47' to the N4 conductor of the system and contacts 51', 52' to the L4 conductor of the system.

Outlet units 44 and 45 contain identical ground contacts 57 contained in the outlet unit housing along the longitudinal center line of the housing for engaging system ground. An opening in the back face of the outlet unit housing positioned in alignment with contact 57 permits access thereto by one of two tangs 58 or 59 which are formed on bus bar 15 to project forward from the face of the housing of power block 10. When either of the A or B types of outlet units is installed in the power block in a first orientation, tang 58 engages contact 57 to connect contacts 55, 56 to the safety ground conductor of the system, as shown on the right-hand sides of FIGS. 17 and 18 respectively. When either of the outlet unit types is installed in the power block in the second orientation, tang 59 engages contact 57 to connect contacts 55, 56 to the safety ground conductor of the system, as shown on the left-hand sides of FIGS. 17 and 18 respectively.

FIGS. 12–14 illustrate further details of the two types of outlet units 44 and 45 used in the system. For purposes of illustrations outlet units 44, 45 are shown as duplex receptacles. It is to be understood, the receptacles may also be simplex, triplex, etc. Both types of outlet units 44 and 45 use identical housings comprising a base section 160 and a cover 161 molded from insulating material. FIG. 14 is an isometric drawing of a type B connector 45 with the cover 160 removed and rotated to show the underside thereof. All four of the insulting silos, 31" and 32" of unit 45 and 33" and 34" of unit 44, are molded onto the rear face of base 160 in one quadrant thereof. Only silos 31", 32" and 33" can be seen in FIGS. 12-14. The cover 161 contains two identical sets of openings each of which sets includes a D-shaped opening 162, a T-shaped opening 163 and a rectangular opening 164 for accepting any of the common plug types, such as a two-prong, non-polarized plug; a two-prong, polarized plug or a three-prong grounded plug. The underside of cover 161 includes a plurality of pedestals 161a, 161b that extend into housing 160 and are configured to provide means for retaining respective contact members in housing 160 and in electrical engagement with the selected bus bar members as plugs (not shown) are inserted and/or removed from the duplex receptacle. Cover 161 further includes staking posts 161c for securing cover 161 to base section 160. FIGS. 15 through 19 show respective pedestals 161b in position against respective ground contact members 54 and FIG. 20 shows a plurality of pedestals 161a.

A channel 165, having end portions 166, 167 of enlarged width, extends along the longitudinal center line of base 160. Ground contacts 55-57, formed as an integral piece 54, fit into channel 165 with contacts 55 and 57 occupying channel portion 166 and contact 56 occupying channel portion 167. Contacts 55-57 are of U-shaped configuration with contacts 55 and 56 open to the face of the outlet unit in alignment with the openings 162 in the cover 161. Both ends of base 160 are stepped inward across the width of the base to create end ledges 168, 168' having a height 169 equal to the height of mounting posts 101 and 102 (FIG. 5) on the power block faces. The interior of base 160 is thickened at the opposite ends along the center line of the base to provide strengthened mounting blocks 171, 171' having recessed holes therein through which fasteners are passed into posts 101, 102 to secure the outlet unit in place in a power block. The wall of mounting block 171' forming the end wall of channel portion 166 is slotted along the center line to allow entry of one of the ground tangs 58 or 59 into portion 166 when the outlet unit is installed in a power block. The downward facing ground contact 57 of the outlet unit then engages the portion of tang 58 or 59 protruding into channel portion 166.

Four generally rectangular-shaped piers 173 extend upward from the floor of base 160, each in alignment with one of the silos 31"-34" projecting from the rear face of base 160. Slots 31d-34d, identical in form to the slots described with reference to FIG. 7, extend through the piers 173 respectively aligned with silos 31"-34" and open to the rear face of base 160 within the enclosures formed by silos 31"-34".

Referring to FIG. 12, contacts 46, 47 and 49 are formed as a unitary piece from strip 48. Contacts 46 and 47 are each comprised of three leaves 175-177 bent upward from the lower edge of strip 48 to converge at the outer ends thereof. Contacts 46 and 47 engage one of the prongs of a non-polarized plug between the under surface of leaf 75 and the outer edges of leaves 177 and 176. The prong of a polarized plug for connecting to a neutral line is engaged between the facing surfaces of leaves 176 and 177. The end of strip 48 extending beyond contact 47 is bent into an L-shape having a leg 170 extending transversely to the axis of contacts 46 and 47 and a leg 178 extending outward in a direction parallel to the axis of contacts 46 and 47. Contact 49 for engaging the N1 or N2 bus bar, 19 or 12, of the power block is formed along and faces downward from the lower edge of leg 178. The contacts 46-49 fit into base 160 with contacts 46 and 47 in alignment with the T-slots of cover 161. The portion of strip 48 connecting contacts 46 and 47 extends between the facing edges of partitions 179-183. The leg 170 runs along the wall of partition 183 and the leg 178 enters slot 34d along the edge thereof facing partition 183.

Contacts 51-53 are formed as a unitary piece from strip 50. Contacts 51 and 52 are each formed of a single leaf bent upward from the lower edge of strip 50 in facing relationship to strip 50. The portion of strip 50 extending beyond contact 52 is bent perpendicularly to the axis of contacts 51, 52 to form a leg 184 extending transversely to the axis of contacts 51, 52 and the end portion of leg 184 is bent back perpendicularly along a line parallel to the axis of contacts 51, 52 to form an end leg 185. Contact 53 for engaging L1 or L2 bus bars 17 Or 13, projects downward from the low edge of leg 185.

Contacts 51-53 fit into base 160 with the open ends of contacts 51 and 52 facing upward in alignment with slots 164 of cover 161. The portion of strip 50 connecting contacts 51 and 52 extends along the face of wall 186 forming one side of channel 165. Contacts 51 and 52 respectively fit into niches 187 and 188 in wall 186 and are held in position therein by a post 189, which extends upward from the floor of base 160 opposite niche 187 and from a ridge formed on the face of the pier 173 opposite niche 188. Arm 184 extends along the internally facing wall of partition 183 and arm 185 enters 34d along the edge thereof adjacent the inwardly facing wall of partition 183.

Referring to FIG. 13, the assemblies of contacts 46', 47', 49' and 51', 52' in outlet unit 45 are of substantially the same form as the assemblies of contacts 46, 47 49 and 51, 52 in outlet unit 44, except that the arms 170' and 184' shown in FIG. 13 are longer than the corresponding arms 170 and 184 shown in FIGS. 12. When the assembly of contacts 46', 47' and 49' is installed in base 160 the disposition of contacts 46' and 47' in the base will be the same as the disposition of contacts 46 and 47 described with reference to FIG. 12. Because of the longer length of arm 170', however, contact 49' will be disposed in slot 32d, entering the slot from the end thereof adjacent the facing wall of partition 183 and will engage either the N3 or N4 bus bars 19, or 12. Similarly, when the assembly of contacts 51'-53' is installed in base 160, the disposition of contacts 51' and 52' therein will be the same as the disposition of contacts 51 and 52 described with reference to FIG. 12. Again, because of the longer length of arm 184', contact 53' will be disposed in slot 31d, entering slot 34d through the end thereof adjacent the internally facing wall of partition 183 and will engage either the L3 or L4 bus bars, 20 or 11. Contact assemblies 46', 47' and 51'-52' are shown installed in base 160 in FIG. 14. Further details of the outlet units are disclosed in co-pending application Ser. No. 07/394,781, filed Aug. 16, 1989, for "Plug-In Outlet Unit for Modular Furniture Power Distribution System," owned by the assignees of the present invention and incorporated by reference herein.

Figure 15:
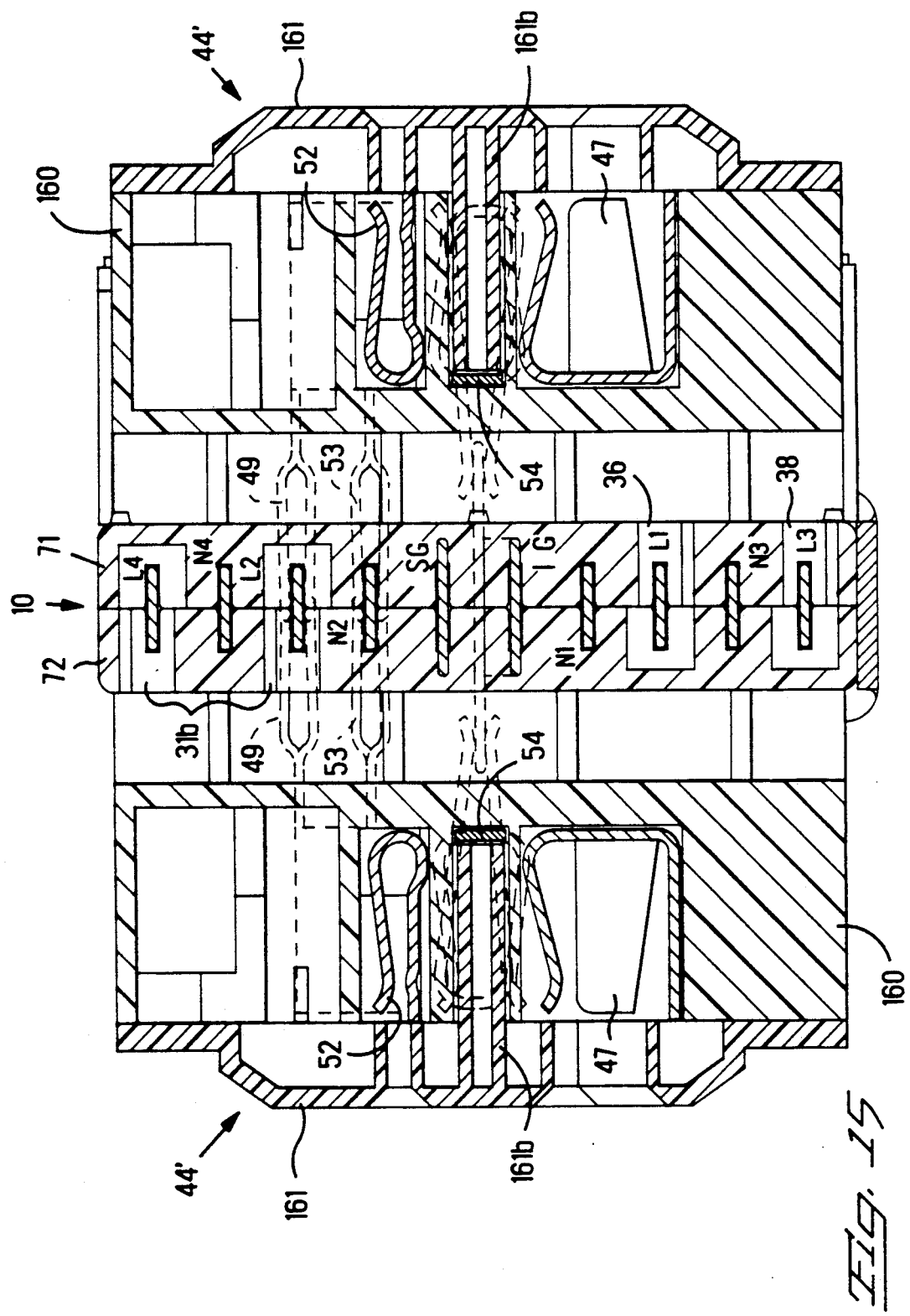
FIG. 15 is a vertical section through a power block having a duplex outlet unit of the type shown in FIG. 12 installed in the opposite faces of the power block with both outlet units being oriented to the same hand.

FIG. 15 is a vertical section through a power block 10 showing an outlet unit 44', of the type shown in FIG. 12, installed in the opposite faces of the power block. The outlet units 44', 44'are both installed with the contacts 49 and 53 oriented to the right, when the rear face of unit 44 is viewed. Contacts 53 and 49, of the outlet unit shown to the right, respectively enter openings 33 and 34 of power block housing section 71 (see FIG. 5) to engage L2, N2 bus bars, 13 and 14. Contacts 53 and 49, of the outlet unit shown to the left, respectively enter openings 33b and 34b of housing section 72 and also engage bus bars 13 and 14. Thus contacts 52 of both outlet units are connected to the L2 conductor of the system and contacts 47 of both outlet units are connected to the N2 conductor of the system.

Figure 16:
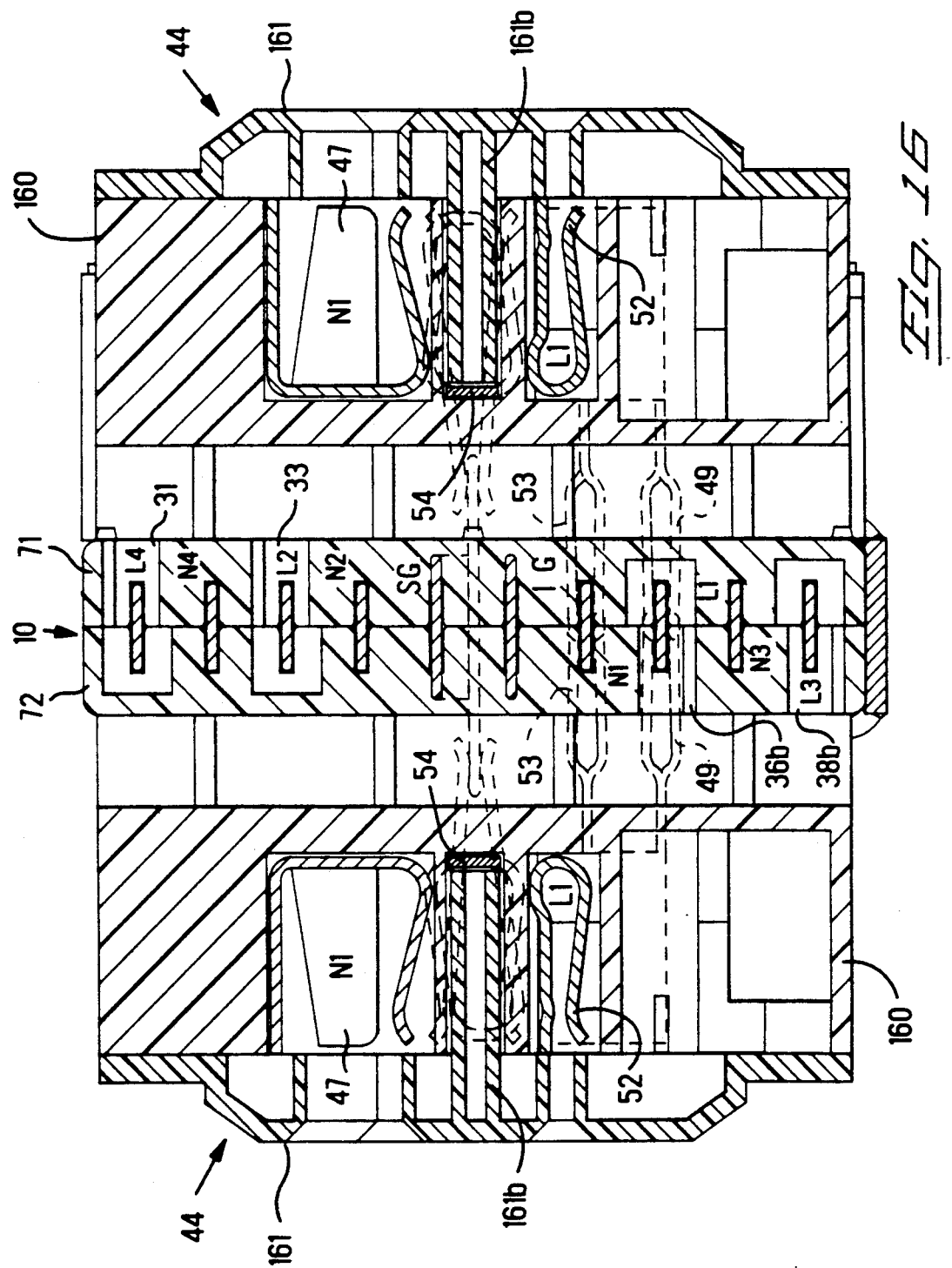
FIG. 16 is a section similar to FIG. 15, except that both outlet units are installed in the power block oriented to the opposite hand from those of FIG. 15.

FIG. 16 shows the outlet units 44, 44 installed in the power block with contacts 49 and 53 of both units oriented to the left, when the rear face of outlet unit 44 is viewed. Contacts 53 and 49, of the outlet unit 44 shown to the right, respectively enter openings 35 and 36 of power block housing section 71 (see FIG. 5) and engage bus bars 17 and 18. Contacts 53 and 49, of the outlet unit 44 shown to the right, respectively enter openings 35b and 36b of power block housing section 72 and also engage bus bars 17 and 18. Thus, contacts 52 of both outlet units are connected to the L1 conductor of the system and contacts 47 of both outlet units are connected to the N1 conductor of the system.

Figure 17:
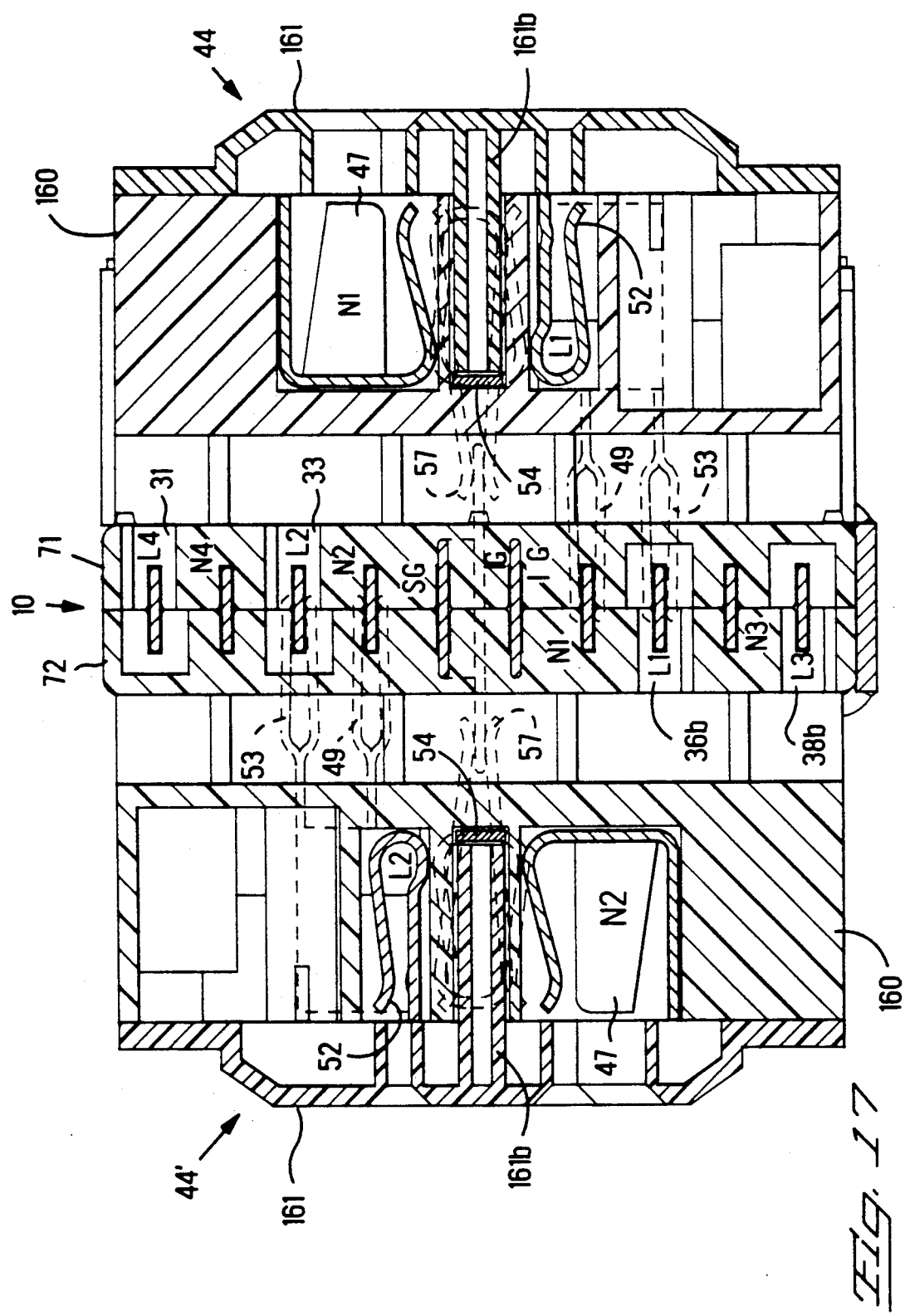
FIG. 17 is a section similar to FIG. 15 or FIG. 16, except the outlet units installed in the opposite faces of the power block are oriented to the opposite hands.

FIG. 17 is a vertical section through a power block 10 having an outlet unit 44, of the type shown in FIG. 12, installed in power block housing section 71 with the same orientation of unit 44 as is shown in FIG. 16. Contacts 52 and 47 of unit 44 are thus respectively connected to the L1 and N1 conductors of the system. FIG. 17 further includes an outlet unit 44' of the type shown in FIG. 12, installed in power block housing 72 with the same orientation as is shown in FIG. 15. Contacts 52 and 47 of unit 44' are thus respectively connected to the L2 and N2 conductors of the system.

Figure 18:
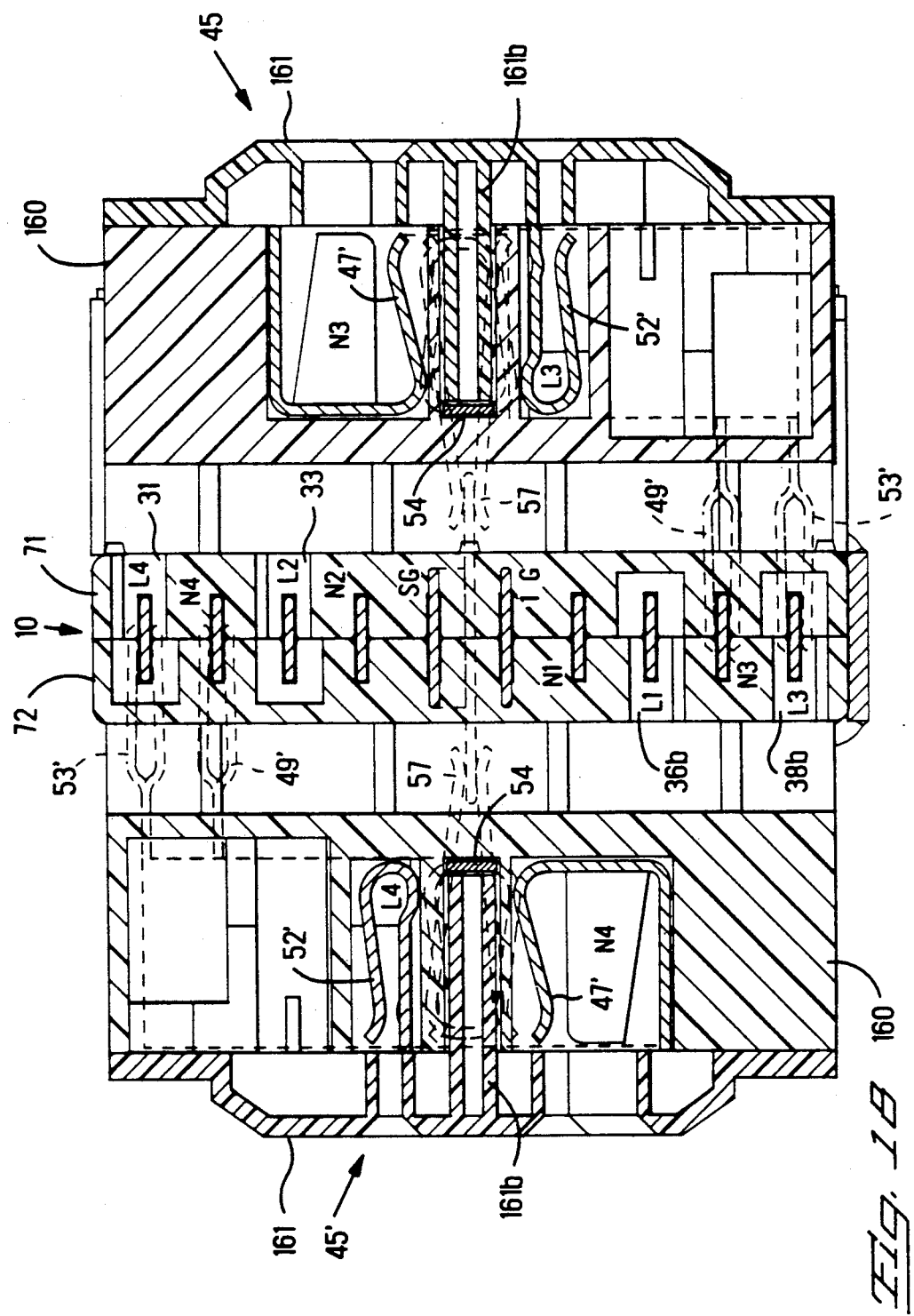
FIG. 18 is a vertical section through a power block having an outlet unit of the type shown in FIG. 13 installed in the opposite faces of the power block with both outlet units being oriented to the same hand.

FIG. 18 is a vertical section through a power block 10 having duplex outlet units 45, 45' of the type shown in FIG. 13, installed in the opposite faces of the power block. The outlet unit 45 shown to the right was installed with contacts 49' and 53' thereof positioned to the left, when the rear face of unit 45 is viewed. Contacts 49' and 53' respectively enter openings 37 and 38 of power block housing section 71 (see FIG. 5) to engage bus bars 19 and 20, thereby respectively connecting contacts 52' and 47' of the right hand unit 45 to the L3 and N3 conductors of the system.

Outlet unit 45', shown to the left in FIG. 18, was installed with contacts 49' and 53' thereof positioned to the right, when the rear face of unit 45 is viewed. Contacts 53' and 49' respectively enter openings 31b and 32b in power block housing section 72 to engage bus bars 11 and 12, thereby respectively connecting contacts 52' and 47' of the left-hand unit 45' to the L4 and N4 conductors of the system.

Figure 19:
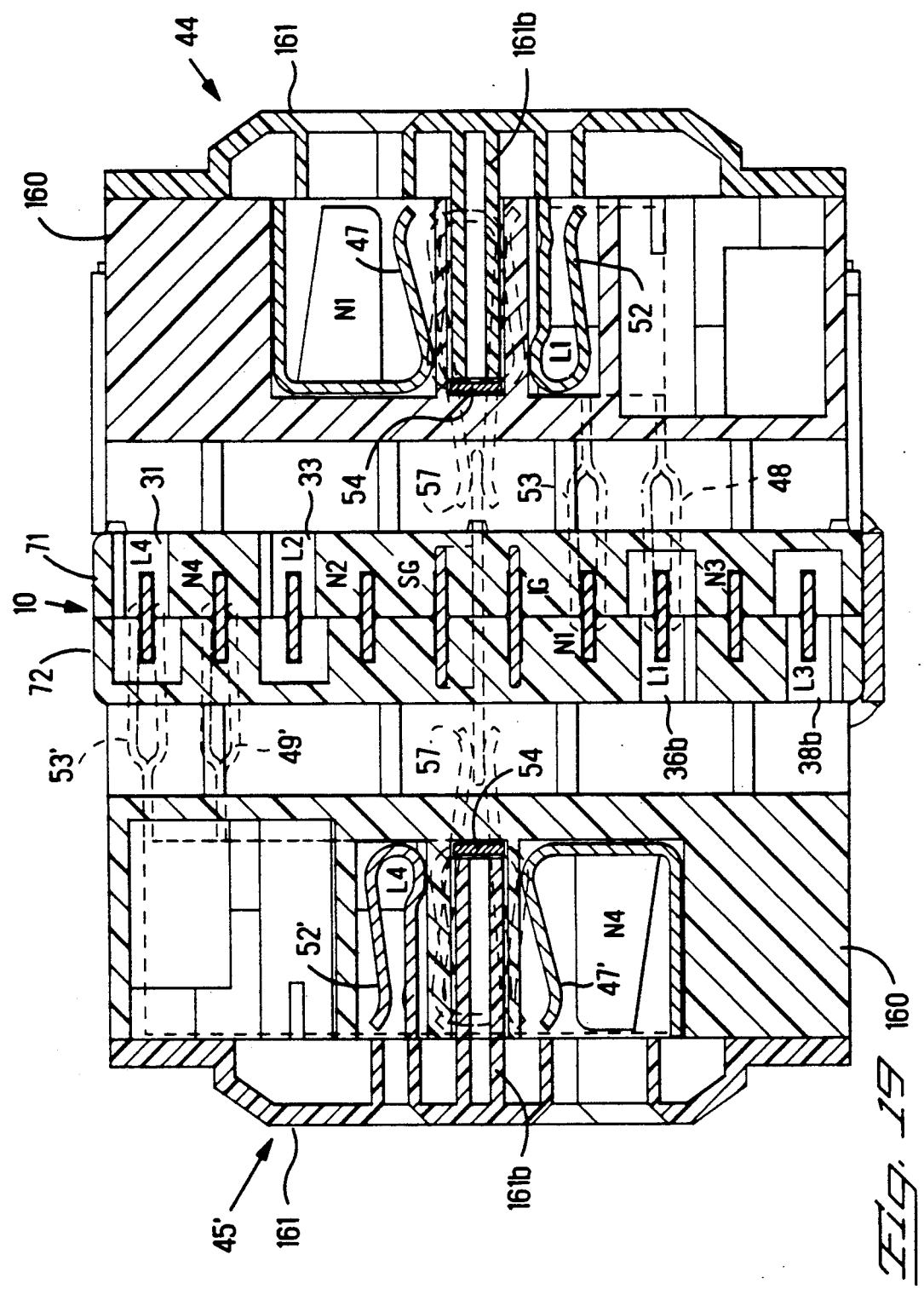
FIG. 19 is a vertical section through a power block having an outlet unit of the type shown in FIG. 12 installed in the right hand face of the power block and an outlet unit of the type shown FIG. 13 installed in the left hand face of the power block.
Figure 20:
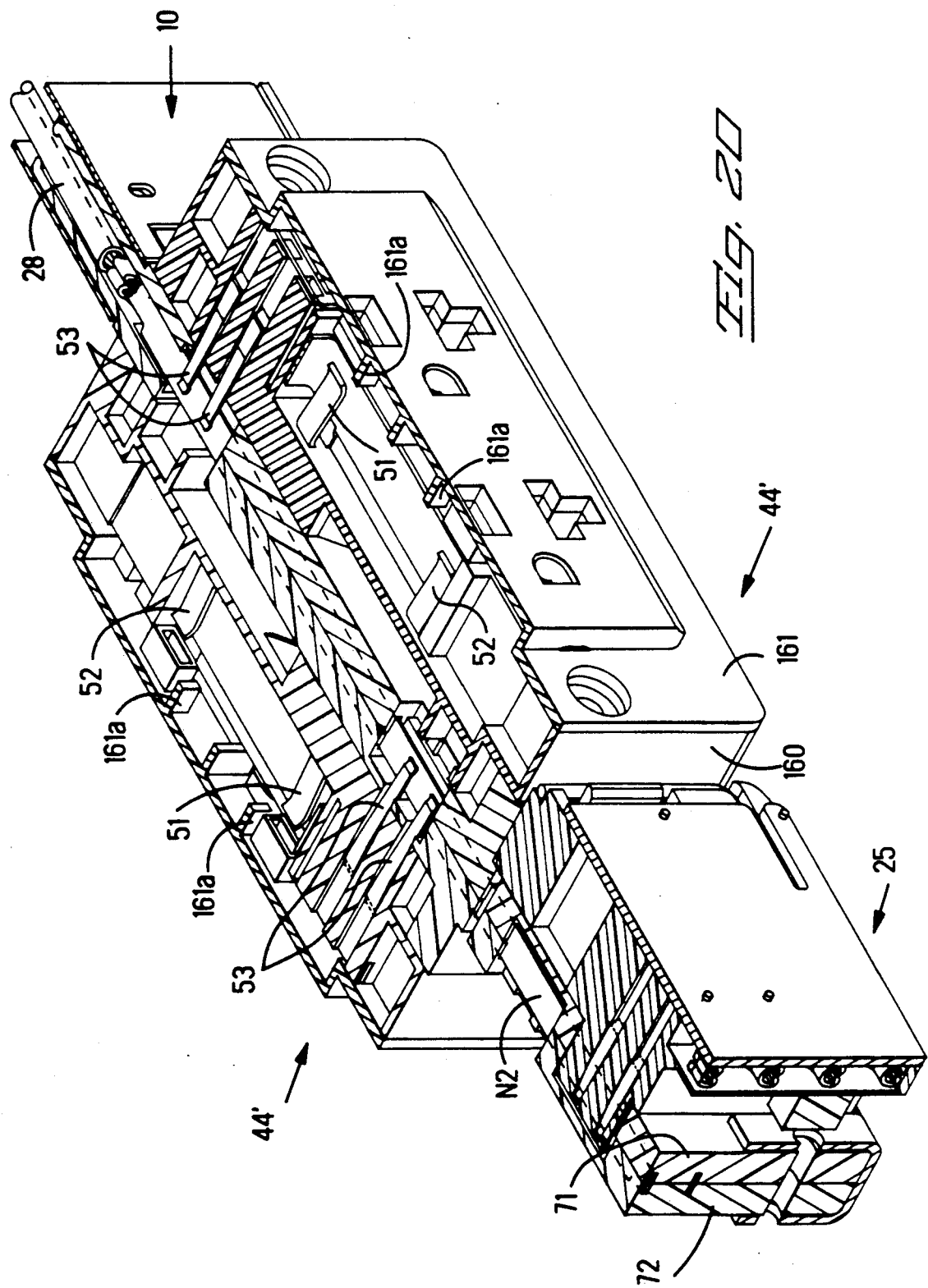
FIG. 20 is a longitudinal section through a power block having an outlet unit of the type shown in FIG. 12 installed in the opposite faces of the power block with both outlet units being oriented to the same hand as those shown in FIG. 15.

FIG. 19 is a vertical section through a power block 10 having an outlet unit 44, of the type shown in FIG. 12, installed in power block housing section 71 with the same orientation of unit 44 as is shown in FIG. 16. Contacts 52 and 47 of unit 44 are thus respectively connected to the L1 and N1 conductors of the system.

In FIG. 19, an outlet unit 45' is installed in power block housing section 72 with the same orientation as the unit 45' shown to the left in FIG. 18, thereby respectively connecting contacts 52' and 47' of unit 45 to the L4 and N4 conductors of the system.

FIG. 20 is a longitudinal section through a power block 10 having outlet units of the type shown in FIG. 12 installed in the opposite faces of the power block with the same orientation as is shown in FIG. 15. A jumper cable connector 25 is shown installed in housing section 71 of the power block. The longitudinal spacing between the contacts 53 of the respective outlet units 44', which is not evident in FIG. 15, is clearly seen in FIG. 20. Contacts 49 of the respective outlet units 44 are similarly longitudinally spaced, but these contacts are not seen in FIG. 20.

The power distribution system 67 of the invention installed within the bottom edge of a typical modular wall panel unit 62, as shown in FIG. 1. At the bottom edge of panel unit 62, top and bottom longitudinal rails 63, 64 are secured in spaced relationship by vertical brackets 65, 65' defining an open faced channel running the length of the panel unit. Adjustable foot pads 66, 66' extend downward from bottom rail 64 near the opposite ends of the panel unit to support the panel against the floor. The power distribution system 67 is installed within the channel defined by rails 63, 64 with the longitudinal center line of the distribution system aligned with the longitudinal center lines of the top and bottom rails. As previously described, system 67 includes identical, but oppositely directed power blocks located near the opposite ends of a panel unit.

The power blocks and interconnecting wiring therefor are assembled as a unit 67, as shown in FIG. 2, and the unit 67 is installed in the panel during manufacture of the panel. The unit 67 is secured in the wiring channel of the panel by fasteners that attach the mounting brackets 68, 68' at each end of unit 67 to the vertical brackets 65, 65' of the panel unit. After installation of the desired combination of plug-in components at the panel installation site, the wiring system may be concealed by decorative finish covers. The end of one such cover is seen at 69 in FIG. 1.

Figure 21:
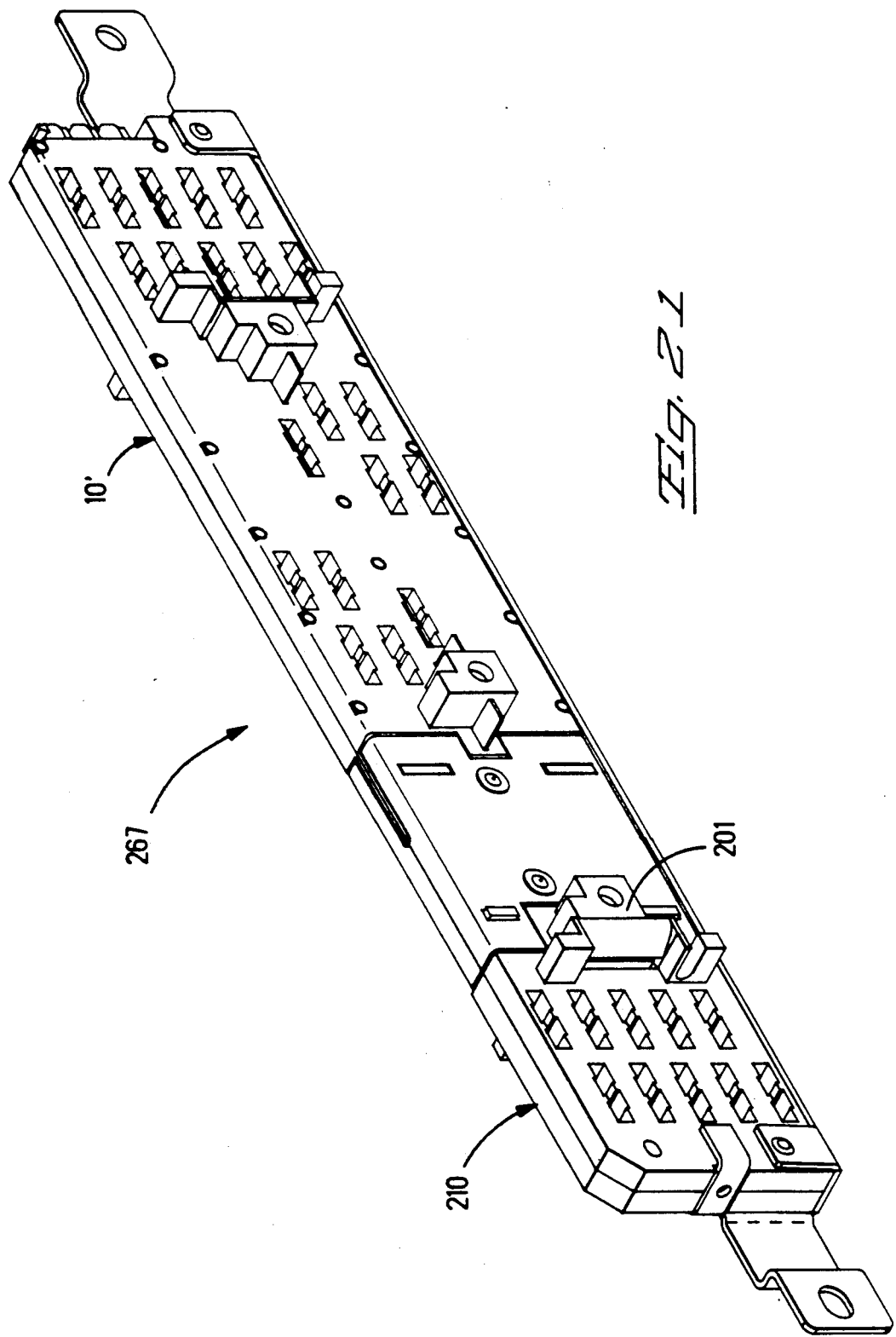
FIG. 21 is an alternative embodiment of the power distribution system of the present invention.

FIG. 21 is an alternative embodiment 267 of the power distribution system of the present invention, which is designed for use in wall panels that are too narrow in width to accept the previously described system. This embodiment includes one power block unit 10' for interconnecting a panel to panel connector 25 and up to two duplex outlet units and block portion 210 for connecting a panel to panel connector 25. Portion 210 includes post section 201 for securing connector 25 thereto in the manner as previously described.

Figure 22:
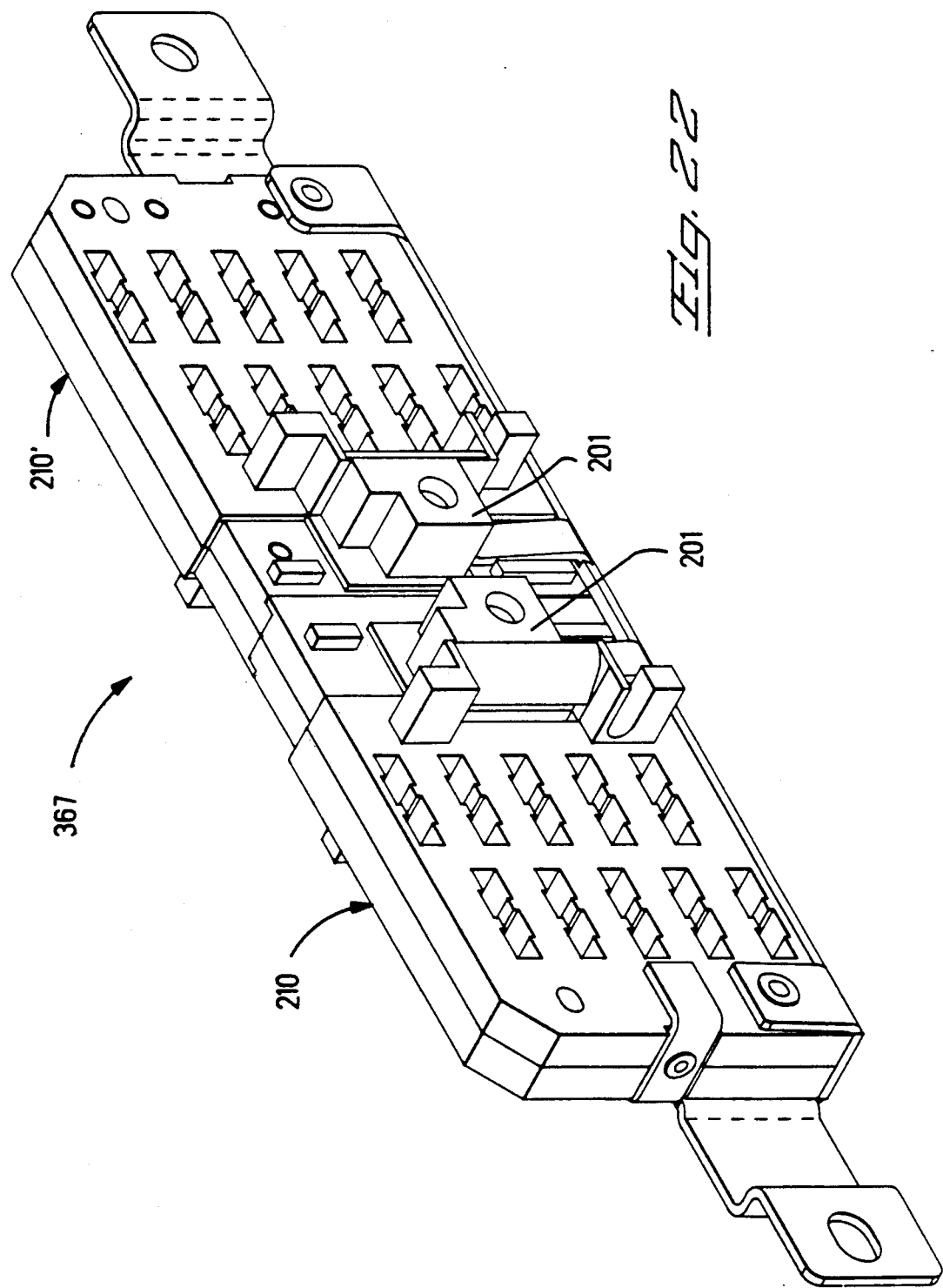
FIG. 22 is a further alternative embodiment of the power distribution system of the present invention.

FIG. 22 is a further alternative embodiment of the power distribution system of the present invention, which is designed primarily for use in wall panels that are too narrow in width to accept either of the previously described systems. This embodiment includes two block portions 210, 210' for connecting two panel to panel connectors 25, 25'. Portions 210, 210' include post sections 201, 201' for securing respective connectors 25, 25' thereto in the manner as previously described. This embodiment provides "pass through" capabilities only.

Obviously, many modifications and variations in the specific embodiment of the invention described herein are possible in the light of the above teachings. It is therefore to be understood that the invention may be practiced otherwise than as specifically disclosed without departing from the spirit and scope of the appended claims.

We claim:

1. A power input system for a power distribution system for modular furniture units of the type having a wiring channel extending within the unit for transmitting electrical power from an input site to at least one output site along an array of at least five conductors including a ground conductor, at least one line conductor and at least one neutral conductor, comprising:

a power block assembly including an insulating housing having a planar, vertical exterior face;

a plurality of flat bus bars contained within said housing, each said bus bar being disposed in a separate horizontal plane, said bus bars extending in parallel along the length of said housing in a vertically aligned array and said housing inwardly of said exterior face includes a plurality of bus-receiving channels along which said bus bars are disposed;

a plurality of openings in said face of said housing at an input site, each of said openings being aligned with one of said bus bars for providing access to said one bus bar by a respective contact of a power input means; and power input means for connecting each of said bus bars of said power block to a separate one of line, neutral and safety ground conductors of a power supply for the site at which said power distribution system is installed, said power input means including an insulating connector housing, a plurality of contacts therewithin terminating respective ones of said line, neutral and ground conductors of the power supply, said plurality of contacts extending from a mounting face of said connector housing and enclosed within respective insulated silos for electrically engaging respective corresponding ones of said bus bars within said power block housing upon said power input means being assembled thereto, each said silo including a bus-receiving slot extending thereinto from a leading end enabling receipt of a respective one of said bus bars upon assembly to establish electrical connection with a said contact therewithin;

each of said contacts and respective silos of said power input means being horizontally staggered along said mounting face from the next vertically successive one thereof, each said corresponding opening being horizontally staggered along said housing face from the next vertically successive one of said openings so that no two vertically successive ones of said openings associated with adjacent ones of said bus bars are in vertical alignment, whereby when the power input means is assembled to the power block of the power distribution system, horizontal staggering of the insulated contacts and corresponding openings defined in the insulating housing exposing the bus bars to the contacts enables close vertical spacing of planar bus bars while maintaining insulative material of at least a minimum thickness therebetween, thereby minimizing the vertical dimension of the power block housing.

2. A power distribution system as claimed in claim 1, wherein said one power block, approximate one end of said face of said housing, includes:

a first group of said openings, each said opening of said first group being aligned with a separate one of each of said bus bars contained in said housing, said openings of said first group being arranged in two vertical, horizontally spaced columns, with the openings of the first of said columns being aligned with alternate successive ones of said vertically aligned bus bars and with the openings of the second of said columns being aligned with alternate successive ones of said bus bars which are interspersed between said ones of said bus bars that are associated with said openings of said first column.

3. A power input system as claimed in claim 2, with additionally:

a plurality of insulated conductors extending within said wiring channel of said furniture unit, one each of said conductors being connected to the end of one each of said bus bars contained in said housing of said one power block, said conductors each being connected at the ends of said bus bars opposite the ends of said bus bars associated with said openings of said first group of openings.

4. A power input system as claimed in claim 3, wherein said system includes:

a jumper cable for connecting said system to a second, similar power distribution system installed in a second furniture unit, said jumper cable having a plurality of conductors, one each for each said bus bar contained in said one power block; and a jumper cable connector, said jumper cable connector including:

an insulating housing having a planar exterior face; and a plurality of contacts, one each attached to one end of each said conductor of said jumper cable, said contacts being mounted in said connector housing with a portion of each said contact projecting through said connector housing face, said contacts being positioned within said connector housing so that said projecting portions thereof are arranged in two columns corresponding to said first and second columns of said first group of openings in said face of said one power block, said connector contacts, when said connector is installed in said one power block with said face of said connector housing abutting said face of said housing of said one power block, extending through said openings of said first group and engaging said bus bars aligned with said openings of said first group.

5. A power distribution system as claimed in claim 3, wherein said one power block additionally includes:

second and third groups of openings in said face of said power block housing, said second group of openings being positioned above the longitudinal center line of said face of said housing, each of said openings of said second group being aligned with a separate one of those ones of said bus bars which are positioned within said housing above the longitudinal center line of said housing, said openings of said second group being arranged in a pattern whereby no two vertically successive ones of said openings are vertically aligned, each of said openings of said third group being aligned with a separate one of those ones of said bus bars which are positioned within said housing below the longitudinal center line of said housing, said openings of said third group being arranged in a pattern whereby no two vertically successive ones of said openings are vertically aligned, said pattern of said third group of openings being symmetrical with said pattern of said second group of openings, said third group of openings being positioned below the longitudinal center line of said face of said housing and diagonally opposite said second group of openings, said openings of said second and third groups providing access to the ones of said bus bars associated therewith whereby a duplex outlet unit for providing power to a load external to said system may be selectively connected to a particular pair of said bus bars associated with said openings of said second and third groups.

6. A power input system as claimed in claim 5, with additionally:
a second power block identical to said one power block,
said one power block being installed in said wiring channel of said furniture unit with said end of said one power block housing having said first group of openings being positioned adjacent one vertical edge of said furniture unit,
said second power block being installed in said wiring channel of said furniture unit with an end of said second power block housing having the group of openings corresponding to said first group of openings of said one power block being positioned adjacent the vertical edge of said furniture unit opposite said one vertical edge thereof and with the ends of the bus bars of said second power block in facing relationship to the like ends of like ones of said bus bars of said one power block,
the ends of said bus bars of said second power block and the ends of said like ones of said bus bars of said one power block facing one another being connected to the opposite ends of the same ones of said conductors in said furniture unit wiring channel.

7. A power input system as claimed in claim 6, wherein:
said second group of openings in said face of said one power block includes an opening aligned with each one of said bus bars contained in said housing that is positioned in said housing above the longitudinal center line of said housing;
said third group of openings in said face of said one power block includes an opening aligned with each one of said bus bars contained in said housing that is positioned in said housing below the longitudinal center line of said housing; and wherein:
said means for connecting each of said bus bars of said power block to a separate one of line, neutral and safety ground conductors of a power supply for the site at which said power distribution system is installed, comprises:
a power-in connector including;
a housing,
said housing having a planar exterior face;
a plurality of terminals contained in said power-in connector housing,
each of said terminals being connected to a separate one of said line, neutral and safety ground conductors of said power supply,
a first group of said terminals being positioned in said housing so that a portion of each terminal of said first group projects through said face of said housing of said power-in connector in a pattern congruent with the pattern of said second group of openings in said face of said one power block,
a second group of said terminals being positioned in said housing so that a portion of each terminal of said second group projects through said face of said housing of said power-in connector in a pattern congruent with the pattern of said third group of openings in said face of said one power block, whereby said power-in connector may be installed in said one power block with said face of said power-in connector housing abutting said face of said power block housing with said projecting portions of said terminals of said first group entering said second group of openings in said power block housing face and engaging the ones of said bus bars aligned with said openings of said second group, and with said projecting portions of said terminals of said second group entering said third group of openings in said power block housing face and engaging the ones of said bus bars aligned with said openings of said of said third group.

8. A power input system as claimed in claim 1 wherein said modular furniture unit is a wall panel.

9. A power distribution system for prewiring modular furniture units of the type having a wiring channel extending within the unit, said system having at least one power block adapted to receive a power input means for connecting said component to conductors of said system, said power block comprising:
an insulating housing of generally rectangular shape with front and rear planar faces;
a plurality of flat bus bars contained within said housing, said bus bars extending in parallel along the length of said housing in a vertically aligned array;
a first plurality of openings in said front face of said housing;
a second plurality of openings in said rear face of said housing;
one each of said openings in each said housing face being aligned with one of said bus bars,
said first plurality of openings in said front face of said housing being arranged in a symmetrical pattern with a first half of the number of said first plurality of openings being grouped in an upper quadrant of said front face and with the remaining half of the number of said first plurality of openings being grouped in a lower quadrant of said front face diagonally opposite the quadrant in which said first half of the number of said openings is located;
said symmetrical pattern being such that no two of said openings in said pattern that are aligned with adjacent ones of said bus bars are in vertical alignment;
said second plurality of openings in said rear face being arranged in a second symmetrical pattern identical to said symmetrical pattern of said first plurality of openings, with a first half thereof being grouped in an upper quadrant of said rear face not aligned with the opening-containing upper quadrant of said front face; and
the remaining half being grouped in a lower quadrant of said rear face, not aligned with the opening-containing lower quadrant of said front face;
said openings in said front and rear faces of said housing each providing an entranceway for the insertion of a contact of a power input means to permit the engagement by said contact with the one of said bus bars aligned with the opening through which said contact enters said housing, the point of engagement of said contact with said bus bar being within said housing.

10. A power distribution system as claimed in claim 9, wherein said system includes:
means for connecting each of said bus bars of said power block to a separate one of line, neutral, safety ground and isolated ground conductors of a power supply for the site at which said power distribution is installed.

11. A power distribution system as claimed in claim 10, wherein said one power block, proximate one end of said front face of said housing, includes:
a third plurality of said openings,
each said opening of said third plurality being aligned with a separate one of each of said bus bars contained in said housing, and having a selected height;
said openings of said third plurality being arranged in two vertical, horizontally spaced columns, with the openings of the first of said columns being aligned with alternate successive ones of said vertically aligned bus bars and with the openings of the second of said columns being aligned with alternate successive ones of said bus bars which are interspersed between said ones of said bus bars that are associated with said openings of said first column and the openings within each column being spaced apart a distance just greater than said selected height of an opening.

12. A power distribution system as claimed in claim 11, wherein said one power block, proximate the end of said rear face of said housing opposite said one end of said front face, includes:
a fourth plurality of openings in said rear face of said housing,
each said opening of said fourth plurality being aligned with a separate one of each of said bus bars contained in said housing, and having a height equal to said selected height of a said third opening;
said openings of said fourth plurality being arranged in third and fourth vertical, horizontally spaced columns corresponding to said two columns of openings in said front face and the openings within each column being spaced apart a distance just greater than said selected height of an opening,
whereby when the power input means is assembled to the power block of the power distribution system, horizontal staggering of the insulated contacts and corresponding openings defined in the insulating housing exposing the bus bars to the contacts enables close vertical spacing of planar bus bars while maintaining insulative material of at least a minimum thickness therebetween, thereby minimizing the vertical dimension of the power block housing.

13. A power distribution system as claimed in claim 12, wherein said system includes:
a jumper cable for connecting said system to a second, similar power distribution system installed in a second furniture unit, said jumper cable having a plurality of conductors, one each for each said bus bar contained in said one power block; and
a jumper cable connector,
said jumper cable connector including:
an insulating housing having a planar exterior face; and
a plurality of contacts, one each attached to one end of each said conductor of said jumper cable, said contacts being mounted in said connector housing with a portion of each said contact projecting through said connector housing face,
said contacts being positioned within said connector housing so that said projecting portions thereof are arranged in two columns corresponding to said first and second columns of said third plurality of openings in said face of said one power block,
whereby said jumper cable connector may be installed in said front face of said power block housing with said face of said connector housing abutting said front face of said power block housing and with said connector contacts extending rough said openings of said third plurality and engaging said bus bars aligned with said openings of said third plurality, or
said jumper cable connector may be installed in said rear face of said power block housing with said face of said connector housing abutting said rear face of said power block housing and with said connector contacts extending through said openings of said fourth plurality and engaging said bus bars aligned with said openings of said fourth plurality.

14. A power distribution system as claimed in claim 13, with additionally:
a second power block identical to said one power block,
said one power block being installed in said wiring channel of said furniture unit with said end of said one power block housing having said third and fourth pluralities of openings being positioned adjacent one vertical edge of said furniture unit,
said second power block being installed in said wiring channel of said furniture unit with the end of said second power block housing having the pluralities of openings corresponding to said third and fourth pluralities of openings of said one power block being positioned adjacent the vertical edge of said panel unit opposite said one vertical edge thereof and with the ends of the bus bars of said one power block at the end opposite the end of said housing of said one power block having said third and fourth pluralities of openings in facing relationship to the like ends of like ones of said bus bars of said one second block; and
a plurality of insulated conductors contained within said wiring channel of said furniture unit and connecting together the facing ends of like ones of said bus bars of said one power block and of said second power block.

15. A power distribution system as claimed in claim 14 wherein:
said first plurality of openings in said one power block housing includes one opening for each said bus bar of said one power block;
said second plurality of openings in said one power block includes one opening for each said bus bar of said one power block; and
the pluralities of openings in said second power block, corresponding to said first and second pluralities of openings of said one power block, each includes one opening for each bus bar contained in the housing of said second power block.

16. A power distribution system as claimed in claim 15, wherein:
said means for connecting each of said bus bars of said power block to a separate one of line, neutral, safety ground and isolated ground conductors of a power supply for the site at which said power distribution system is installed, comprises:
a power-in connector including;
a housing,
said housing having a planar exterior face;
a plurality of terminals contained in said power-in connector housing, each of said terminals being connected to a separate one of said line, neutral, safety ground and isolated ground conductors of said power supply, said terminals being positioned in said housing so that a portion of each said terminal projects through said face of said housing of said power-in connector in a pattern congruent with said symmetrical pattern of said first plurality of openings in said face of said one power block, whereby said power-in connector may be installed in said one power block with said face of said power-in connector housing abutting said front face of said power block housing with said projecting portions of said terminals of said power-in connector entering said first plurality of openings in said front face of said power block housing and engaging the ones of said bus bars aligned with said openings of said first plurality, or said power-in connector may be installed in said one power block with said face of said power-in connector housing abutting said rear face of said power block housing with said projecting portions of said terminals of said power-in connector entering said second plurality of openings in said rear face of said power block housing and engaging the ones of said bus bars aligned with said openings of said second plurality.

17. A power distribution system as claimed in claim 16 wherein:

said plurality of bus bars in said one power block equals ten in number.

18. A power distribution system as claimed in claim 9 wherein said modular furniture unit is a wall panel.

19. A power input system as claimed in claim 1 wherein said plurality of bus bars in said power block equals ten in number including a safety ground.

20. A power distribution system as claimed in claim 11, wherein said system includes:

a jumper cable for connecting said system to a second, similar power distribution system installed in a second furniture unit, said jumper cable having a plurality of conductors, one each for each said bus bar contained in said one power block; and a jumper cable connector, said jumper cable connector including:

an insulating housing having a planar exterior face; and a plurality of contacts, one each attached to one end of each said conductor of said jumper cable, said contacts being mounted in said connector housing with a portion of each said contact projecting through said connector housing face, said contacts being positioned within said connector housing so that said projecting portions thereof are arranged in two columns corresponding to said first and second columns of said third plurality of openings in said face of said one power block, whereby said jumper cable connector may be installed in said front face of said power block housing with said face of said connector housing abutting said front face of said power block housing and with said connector contacts extending through said openings of said third plurality and engaging said bus bars aligned with said openings of said third plurality.

21. A power distribution system for modular furniture units of the type having a wire channel extending within the unit and including at least one power input site, at least one power output site and at least two jumper sites, said system comprising:

power input means;

at least a first power block assembly including:

a first housing having first and second sides and at least five first bus bar portions, each said first and second side of said housing including a first array of first access openings for said power input means, each said first access opening exposing a selected first location along a respective one of said first bus bar portions for electrical engagement and each said first array defining one of said power input site and a power output site; and each said first and second side of said first housing including a second array of second access openings for said jumper means, each said second access opening exposing a selected second location along a respective one of said first bus bar portions for electrical engagement, each said second array defining a jumper site;

at least a second power block assembly including:

a second housing having first and second sides and at least five second bus bar portions, each said first and second side of said second housing including a third array of third access openings, each said third access opening exposing a selected first location along a respective one of said second bus bar portions for electrical engagement, and each said third array defining one of a said power input and a power output site; and each said first and second side of said second housing including a fourth array of fourth access openings, each said fourth access opening exposing a selected second location along a respective one of said second bus bar portions for electrical engagement, each said fourth array defining a jumper site;

means electrically interconnecting said at least five first bus bar portions with respective ones of said at least five second bus bar portions and thereby electrically interconnecting respective ones of said first and second bus bar portions exposed at respective one of said arrays of access openings at said at least one power input site, said at least one power output site and said jumper sites; and at least two jumper means terminated at opposite ends of respective jumper cables, each said jumper means comprising:

housing means including an array of terminal insulating silos extending outwardly from a mounting face thereof, said housing silo array having a configuration that corresponds to one of said second or fourth arrays of second or fourth access openings at a selected jumper site for receipt of respective ones of said housing silos into each of said second or fourth access openings;

at least five electrical terminals disposed in said housing means and corresponding to said at least five interconnected first and second bus bar portions of said first and second power block assemblies, each said terminal having first and second connecting sections, said first connecting sections being electrically engaged with conductors of said jumper cable and said second connecting sections having a contact portion extending into a corresponding silo and being adapted to be electrically engageable with a respective one of said selected second locations of said first and second bus bar portions at said selected jumper site upon said jumper means being assembled to said system, each said silo including a bus-receiving slot extending thereinto from a leading end thereof, thereby enabling receipt into said slot of a respective one of said bus bar portions upon assembly to establish electrical connection with said contact portion therewithin, whereby said system thereby defined is electrically connectable to other like systems of other modular furniture units at said jumper sites by said jumper means wherein said jumper means may be assembled to said system at any one of said jumper sites on said first and second sides of one of said first and second housings thereby enabling electrical interconnection with another furniture unit with a like said jumper site, and said first and second power block assemblies define a plurality of power input sites and a plurality of power output sites.

22. A power distribution system for modular furniture units of the type having a wire channel extending within the unit and including at least one power input site, one power output site and at least two jumper sites, said system comprising:

power input means;

at least two jumper means;

at least a first power block assembly including:

a first housing having first and second sides and at least five first bus bar portions, each said first and second side of said housing including a first array of first access openings for said power input means, each said first access opening exposing a respective one of said first bus bar portions for electrical engagement and each said first array defining one of a said power input site and a power output site; and each said first and second side of said first housing including a second array of second access openings for said jumper means, each said second access opening exposing a respective one of said first bus bar portions for electrical engagement, each said second array defining a jumper site;

at least a second power block assembly including:

a second housing having first and second sides and at least five second bus bar portions, each said first and second side of said second housing including a third array of third access openings, each said third access opening exposing a respective one of said second bus bar portions for electrical engagement, and each said third array defining one of a power input and a power output site; and each said first and second side of said second housing including a fourth array of fourth access openings, each said fourth access opening exposing a respective said second bus bar portion for electrical engagement, each said fourth array defining a jumper site; and means electrically interconnecting said at least five first bus bar portions with respective ones of said at least five second bus bar portions and thereby electrically interconnecting said at least one power input site, said at least one power output site and said jumper sites;

said power input means electrically interconnecting respective conductors of a power supply for said power distribution system with each one of said first or second bus bar portions at a selected power input site, said power input means comprising:

housing means including an array of terminal insulating silos extending outwardly from a mounting face thereof, said housing silo array having a configuration that corresponds to one of said first or third arrays of access openings at said selected power input site for receipt of said housing silos into said access openings;

at least five electrical terminals disposed in said housing means and corresponding to said at least five interconnected first and second bus bar portions of said first and second power block assemblies, each said terminal having first and second connecting sections, said first connecting sections being electrically engaged with said power supply conductors and said second connecting sections having a contact portion extending into a corresponding silo and being adapted to be electrically engageable with one of said first and second bus bar portions at said selected power input site upon said power input site means being assembled to said system, each said silo including a bus-receiving slot extending thereinto from a leading end thereof, thereby enabling receipt into said slot of a respective one of said bus bar portions upon assembly to establish electrical connection with said contact portion therewithin, whereby electrical interconnection is established between said conductors of said power supply and each of the bus bar portions at any one of said power input sites on one of said first and second sides of one of said first and second housings and said system thereby defined is electrically connectable to other like systems of other modular furniture units at said jumper sites by said jumper means, and said first and second power block assemblies define a plurality of power input sites and a plurality of power output sites.

23. A power distribution system for modular furniture units of the type having a wire channel extending within the unit and including at least one power input site, one power output site and at least two jumper sites, said system comprising:

at least two jumper means;

at least a first power block assembly including:

a first housing having first and second sides and at least five first bus bar portions, each said first and second side of said housing including a first array of first access openings for said power input means, each said first access opening exposing a selected first location along a respective one of said first bus bar portions for electrical engagement and each said first array defining one of a said power input site and a power output site; and each said first and second side of said housing including a second array of second access openings for said jumper means, each said second access opening exposing a selected second location along a respective one of said first bus bar portions for electrical engagement, each said second array defining a jumper site;

at least a second power block assembly including:

a second housing having first and second sides and at least five second bus bar portions, each said first and second side of said second housing including a third array of third access openings, each said third access opening exposing a selected first location along a respective one of said second bus bar portions for electrical engagement, and each said third array defining one of a said power input and a power output site; and each said first and second side of said second housing including a fourth array of fourth access openings, each said fourth access opening exposing a selected second location along a respective one of said second bus bar portions for electrical engagement, each said fourth array defining a jumper site;

power input means, said power input means electrically interconnecting respective conductors of a power supply for said power distribution system with each one of said first or second bus bar portions at a selected power input site, said power supply conductors including a plurality of line conductors, at least one neutral conductor and at least one ground conductor;

at least one power output means, said power output means comprising:

housing means including an array of three terminal insulating silos extending outwardly from a mounting face thereof and having a configuration that corresponds to fewer than all of said first or third arrays of first or third access openings at a selected power output site for receipt of said housing silos into corresponding ones of said first or third access openings;

three electrical terminals disposed in said housing means corresponding to line neutral and ground ones of said conductors of said power block assemblies established by interconnection of said power input means thereto, each said terminal having first and second connecting sections, said first connecting sections being adapted to be electrically engaged with a mating electrical article and said second connecting sections having a contact portion extending into a corresponding silo and being adapted to be electrically engageable with a respective one of said selected first locations of said first and second bus bar portions at a said power outlet site, each said silo including a bus-receiving slot extending thereinto from a leading end thereof, thereby enabling receipt into said slot of a respective one of said first and second bus bar portions upon assembly to establish electrical connection with said contact portion therewithin, and said second connecting section of said ground terminal being adapted to receive an outward extending section of a ground bus bar portion within said output housing means; and means electrically interconnecting said at least five first bus bar portions with respective ones of said at least five second bus bar portions and thereby electrically interconnecting respective ones of said first and second bus bar portions exposed at respective one of said arrays of access openings at said at least one power input site, said at least one power output site and said jumper sites, whereby electrical interconnection is established between one each of said line, neutral and ground conductors of said power supply and corresponding terminals of said power output means when said power output means is assembled at any one of said power output sites on one of said first and second sides of one of said first and second housings.

* * * * *